(12) United States Patent
Hayashi

(10) Patent No.: US 9,491,359 B2
(45) Date of Patent: Nov. 8, 2016

(54) AUTOMATIC-TRACKING CAMERA APPARATUS

(75) Inventor: Tadashi Hayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 685 days.

(21) Appl. No.: 13/439,961

(22) Filed: Apr. 5, 2012

(65) Prior Publication Data

US 2012/0188379 A1 Jul. 26, 2012

Related U.S. Application Data

(63) Continuation of application No. 11/848,360, filed on Aug. 31, 2007, now Pat. No. 8,174,580.

(30) Foreign Application Priority Data

Sep. 1, 2006 (JP) .................................. 2006-238156

(51) Int. Cl.
*H04N 5/225* (2006.01)
*H04N 5/232* (2006.01)
*H04N 13/02* (2006.01)
*G01C 11/02* (2006.01)

(52) U.S. Cl.
CPC ........... *H04N 5/23248* (2013.01); *G01C 11/02* (2013.01); *H04N 5/232* (2013.01); *H04N 5/23203* (2013.01); *H04N 5/23219* (2013.01); *H04N 5/23264* (2013.01); *H04N 5/23296* (2013.01); *H04N 13/0221* (2013.01)

(58) Field of Classification Search
USPC ......................................................... 348/169
See application file for complete search history.

(56) References Cited

U.S. PATENT DOCUMENTS

| | | | | |
|---|---|---|---|---|
| 5,023,712 A | * | 6/1991 | Kajiwara | ................ G01S 17/48 348/139 |
| 5,138,444 A | * | 8/1992 | Hiramatsu | ............. G01C 11/02 348/145 |
| 5,969,755 A | | 10/1999 | Courtney | |
| 6,507,366 B1 | | 1/2003 | Lee | |
| 6,672,533 B1 | * | 1/2004 | Regebro | ..................... 244/3.13 |
| 6,741,725 B2 | | 5/2004 | Astle | |
| 7,403,634 B2 | | 7/2008 | Nishiura | |

(Continued)

FOREIGN PATENT DOCUMENTS

JP 05-030406 A 2/1993
JP 6022182 A 1/1994

(Continued)

*Primary Examiner* — Richard G Keehn
(74) *Attorney, Agent, or Firm* — Rossi, Kimms & McDowell LLP

(57) ABSTRACT

An automatic-tracking camera apparatus which is capable of realizing continuous and smooth driving and obtaining an image with little position variation of a tracking target from a target position within the image and with little blur. The position of a camera body is changed by a gimbal device. The speed of a tracking target object at the next-after-next start timing of image acquisition by the camera body is predicted. The gimbal device is controlled so that the camera body reaches the position indicated by a position instruction value generated for the next-after-next start timing of image acquisition by the camera body, at the next-after-next start timing, and the speed of the camera body at the next-after-next start timing of image acquisition by the camera body corresponds to the speed predicted for the next-after-next timing of image acquisition.

10 Claims, 34 Drawing Sheets

(56) References Cited

U.S. PATENT DOCUMENTS

| | | |
|---|---|---|
| 7,710,461 B2 | 5/2010 | Nagano et al. |
| 7,791,646 B2* | 9/2010 | Nishikawa ................. 348/211.9 |
| 7,907,750 B2 | 3/2011 | Ariyur et al. |
| 7,916,172 B2 | 3/2011 | Kagei |
| 2002/0051057 A1 | 5/2002 | Yata |
| 2002/0180870 A1* | 12/2002 | Chen ..................... H04N 5/144 348/207.1 |
| 2003/0160866 A1* | 8/2003 | Hori ....................... G01S 11/12 348/116 |
| 2004/0100563 A1 | 5/2004 | Sablak et al. |
| 2005/0029458 A1 | 2/2005 | Geng et al. |
| 2005/0128309 A1* | 6/2005 | Tomita et al. ............. 348/208.7 |
| 2005/0237385 A1* | 10/2005 | Kosaka et al. .................. 348/42 |
| 2007/0225913 A1* | 9/2007 | Ikeda ................. G06K 9/00798 382/104 |

FOREIGN PATENT DOCUMENTS

| | | |
|---|---|---|
| JP | 8221123 A | 8/1996 |
| JP | 2002-189519 A | 7/2002 |

* cited by examiner

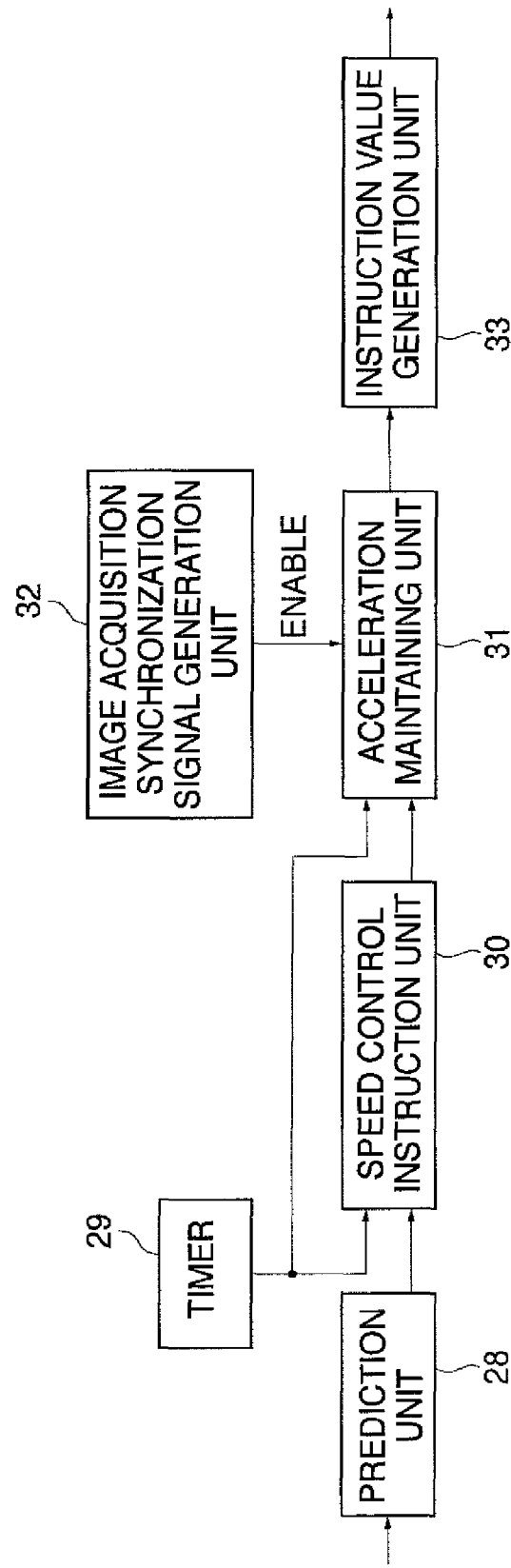

AUTOMATIC-TRACKING CAMERA APPARATUS

CROSS-REFERENCE TO RELATED APPLICATION

This application is a continuation of pending U.S. patent application Ser. No. 11/848,360, filed Aug. 31, 2007, the content of which is incorporated herein by reference.

BACKGROUND OF THE INVENTION

1. Field of the Invention

The present invention relates to an automatic-tracking camera apparatus which is provided with a camera capable of continuously acquiring images and which automatically tracks a target object, such as a person.

2. Description of the Related Art

There has been conventionally known a camera with a pan/tilt rotation mechanism intended for remote control or automatic control in the shooting direction. Meanwhile, there has also been known a technique for detecting the position, the movement speed and the like of a particular target object, such as a person using a technique, such as image recognition, ultrasonic detection, detection by a temperature sensor, or the like. By detecting the position or the movement speed of a predetermined target object with the use of the latter technique and controlling the rotation of the former camera on the basis of the detected values, a tracking operation for automatically catching the target object within the image-taking range of the camera can be performed. Especially, by detecting the target object by the recognition technique with the use of the camera of a pan/tilt camera as a detection device, tracking can be performed with a compact device economically, without necessity of separately preparing a new sensor. Further, it is characterized that, since detection and shooting direction control are performed with the same camera, the configuration is simpler in comparison with an apparatus provided with a sensor and a rotary camera separately.

This kind of automatic-tracking camera apparatus is used, for example, in systems for monitoring of a suspicious person, tracking of a target object in a factory, control of the angle of view in TV relay broadcasting of sports, and the like. As the control method of the automatic-tracking camera, it is usual to detect the position of a target object in an image, specify the angle of driving a rotary camera, and control the rotation by specifying the number of pulses of a servo-controller or a stepping motor on the camera side. As another method, there is a method in which, when a target object is detected, the speed of a rotary camera is controlled so that the movement (motion blur) of the image within the target area is made as little as possible (for example, see Japanese Laid-Open Patent Publication (Kokai) No. 05-30406). A method is also known in which variation between a target object in an image and a target position is detected, and appropriate gain is applied to directly control the actuator of a rotary camera (vision feedback control) (for example, see Japanese Laid-Open Patent Publication (Kokai) No. 2002-189519).

However, in the target detection methods using an image, image acquisition itself requires a lot of time. In a common video camera, the image acquisition rate is 30 frames per second. Further, commonly, the subsequent target detection processing also requires time equal to the time required for image acquisition or more.

The rotation driving control of a rotary camera is generally performed with the use of a sensor attached to the rotation mechanism on the camera side (except for the case of the vision feedback control and the like). For example, the rotation driving control is performed with the use of an angle sensor such as a rotary encoder, an acceleration or speed sensor such as a gyro-sensor, or the current sensor of a motor. In addition, a method of controlling the number of driving pulses with the use of a stepping motor is also used. The speed of these methods is generally faster than that in the case of sensing using an image, and it is capable of realizing dozens to thousands of times faster sampling rate.

FIG. 35 is a block diagram showing rotation driving control in a conventional automatic-tracking camera apparatus. In this apparatus, variation between the position of a target object and a target position is determined from an image detection result; target coordinates of the camera are set on the basis of the determined value, and a high-speed sensor on the camera side is used to perform control to reach the values, as shown in FIG. 35. In comparison with the time required for steps S101 to S107 in FIG. 35, steps S109 to S111, which are steps for control of the rotation of the camera, are performed at a higher speed due to the control operation step S110 and the like.

FIG. 36 is a diagram showing the time response of the camera position in the case where driving is performed in the configuration shown in FIG. 35. FIG. 37 is a diagram showing the time response of the camera speed in the case where driving is performed in the configuration shown in FIG. 35. In such a configuration, since control is performed on the basis of the position, position variation (deviation) due to accumulation does not occur if the control system is appropriately configured. However, there is a problem that, since abrupt acceleration and abrupt deceleration are performed before the target position is reached, the movement is not smooth.

That is, there is a risk that, because of repetition of stop-go (stop and start of driving), vibrations synchronized with the cycle or a strange sound may occur. This vibrations may cause image blurring and the like, thereby affecting the quality of an acquired image. As shown in FIG. 37, in a different design, it is possible to acquire an image during a stable time period when the position varies little. However, since the speed is "0" during the period, the probability that the difference from the speed of a tracking target is much is high.

Therefore, as shown in FIG. 38, the acquired image is such that the tracking target object is blurred though the background is not blurred. The next target position is determined on the basis of this image. Therefore, if the blurring worsens, it causes problems that the target object cannot be extracted or that the position accuracy decreases. As a result, in the case of a tracing target moving at a high speed, it is difficult to accurately track it.

Meanwhile, there is also a method in which speed is specified as the each-time controlled quality. For example, as shown in FIG. 39, there is a double-loop control method in which speed control is performed by an inner loop and position control is performed by an outer loop. Here, the output of the transfer function of a rotation mechanism 103 is speed. An integrator (1/s) 104 is also provided. FIGS. 40 and 41 show a time response and a speed response of the camera position in this method, respectively.

In this case, since driving is continuous, there is not a risk that generation of vibrations and a strange sound due to abrupt acceleration, abrupt deceleration, or stop-go may occur, unlike the case of the position specification. Further, since control is performed at a predicted speed of a target object during image acquisition time, it is characterized that the blurring of the target object is little though the background is blurred, as shown in FIG. 42. As a result, even if the tracking target moves at a high speed, the image blurring of the target object is little. Therefore, the quality of the image corresponding to the part to be tracked, within the image used for recognition, does not deteriorate, and therefore, the detection probability and accuracy do not decrease.

However, it is not assured that a speed profile corresponds to the movement of a tracking target. If they do not correspond to each other, position variation occurs. If the position variation is accumulated, there is a risk that the target object is missed in the worst case. Further, there may be an abrupt acceleration part though it is not so serious as in the position-specification control method. Therefore, there is a problem that driving is not sufficiently smooth.

Furthermore, since high-level response is required from the inner-loop speed control, high gain is required. Therefore, if delay occurs because of slow response of the rotation mechanism as an object to be controlled, or if cogging of a motor or nonuniform load by a transfer system such as a gear occurs, oscillation easily occurs, and the control system tends to be unstable. Therefore, this method cannot be necessarily applied to all objects to be controlled.

SUMMARY OF THE INVENTION

The present invention provides an automatic-tracking camera apparatus which is capable of realizing continuous and smooth driving and obtaining an image with little position variation of a tracking target from a target position within the image and with little blur.

In a first aspect of the present invention, there is provided an automatic-tracking camera apparatus comprising an image pickup unit adapted to change the position thereof and acquire an image in a constant cycle, an actuator adapted to change the position of the image pickup unit, a position grasping unit adapted to grasp the position of the image pickup unit, a position instruction value generation unit adapted to generate a position instruction value for instructing a target position of the image pickup unit at the next-after-next start timing of image acquisition by the image pickup unit, on the basis of the image acquired by the image pickup unit and the position of the image pickup unit grasped by the position grasping unit, in synchronization with the cycle of image acquisition by the image pickup unit, a speed prediction unit adapted to predict the speed of a tracking target object at the next-after-next start timing of image acquisition by the image pickup unit, and a control unit adapted to control the actuator so that the image pickup unit reaches the position indicated by the position instruction value generated for the next-after-next start timing of image acquisition by the image pickup unit, at the next-after-next start timing, and the speed of the image pickup unit at the next-after-next start timing of image acquisition by the image pickup unit corresponds to the speed predicted by the speed prediction unit for the next-after-next timing of image acquisition.

According to the first aspect of the present invention, it is possible to realize continuous and smooth driving and obtain an image with little position variation of a tracking target from a target position within the image and with little blur.

The control unit can control the actuator so that the image pickup unit is displaced at a constant acceleration during the period from the start timing of image acquisition by the image pickup unit to the next start timing of image acquisition.

The control unit can control the actuator so that change in the acceleration of the image pickup unit during the period of image acquisition by the image pickup unit is the minimum.

The control unit can control the actuator so that the acceleration of the image pickup unit gradually increases during the period from generation of the position instruction value by the position instruction value generation unit to the start timing of image acquisition by the image pickup unit.

In a second aspect of the present invention, there is provided an automatic-tracking camera apparatus comprising an image pickup unit adapted to change the position thereof and acquire an image in a constant cycle, an actuator adapted to change the position of the image pickup unit, a position grasping unit adapted to grasp the position of the image pickup unit, a signal generation unit adapted to generate a position instruction value for instructing the target position of the image pickup unit and a feedforward signal, on the basis of an image acquired by the image pickup unit and the position of the image pickup unit grasped by the position grasping unit, in the same cycle as the cycle of image acquisition by the image pickup unit, and a control unit adapted to control the actuator in a cycle shorter than the cycle of image acquisition by the image pickup unit, on the basis of the position instruction value and the feedforward signal generated by the signal generation unit.

According to the second aspect of the present invention, it is possible to realize continuous and smooth driving and obtain an image with little position variation of a tracking target from a target position within the image and with little blur even when a driving system with a slow response or a driving system lacking stableness in driving is provided.

The control unit can control the maximum driving force of the actuator on the basis of the feedforward signal.

The control unit can output a signal for controlling the actuator by performing at least proportional operation or proportional differential operation of the deviation between the position instruction value and the position grasped by the position grasping unit, and change at least one of the proportional gain of the proportional operation and the differential gain of the proportional differential operation on the basis of the feedforward signal.

The signal generation unit can perform at least proportional operation of the deviation between the target position instructed by the position instruction value and the position at the time of generation of the instruction value to generate the feedforward signal.

The feedforward signal can be a value learned on the basis of the deviation between the time when the image pickup unit reaches the target position and the time when the target position is updated.

Further features of the present invention will become apparent from the following detailed description of exemplary embodiments with reference to the attached drawings.

BRIEF DESCRIPTION OF THE DRAWINGS

FIG. 13 is a block diagram showing the configuration of the speed profile generator in an automatic-tracking camera apparatus according to a second embodiment of the present invention.

DETAILED DESCRIPTION OF THE PREFERRED EMBODIMENTS

The present invention will now be described in detail with reference to the drawings showing a preferred embodiment thereof.

Figure 1:
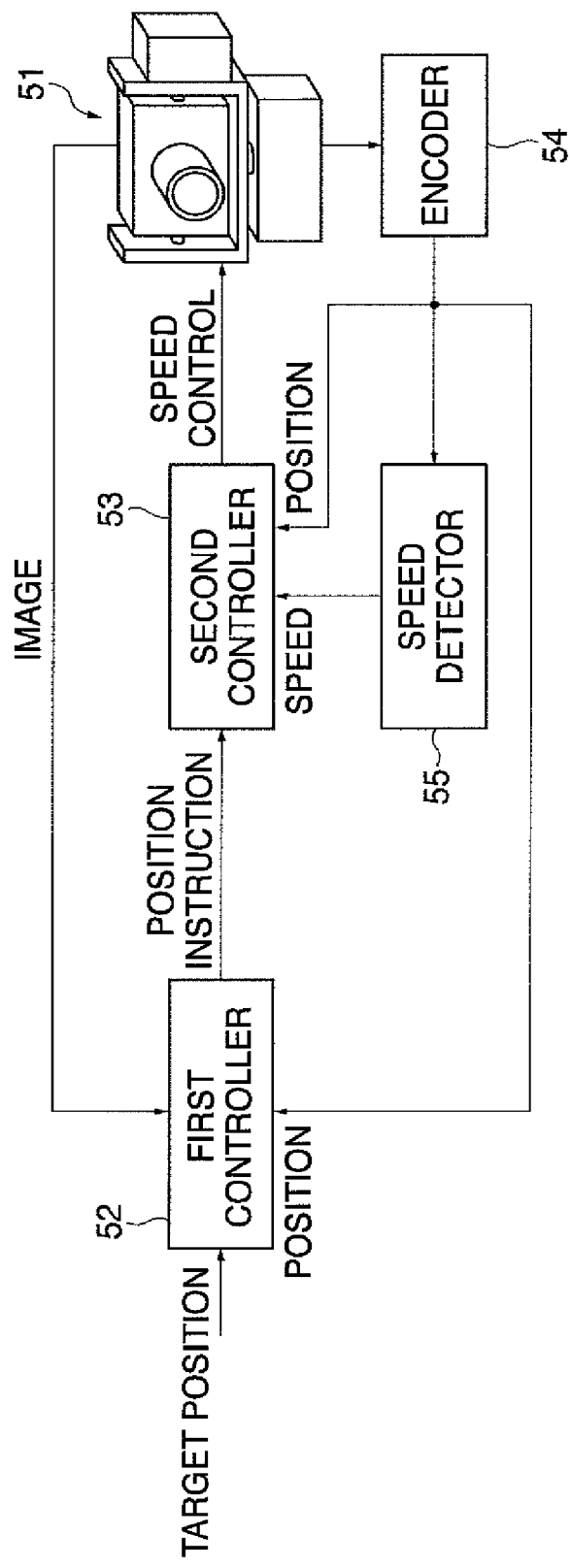
FIG. 1 is a block diagram schematically showing the configuration of an automatic-tracking camera device according to a first embodiment of the present invention.
Figure 2:
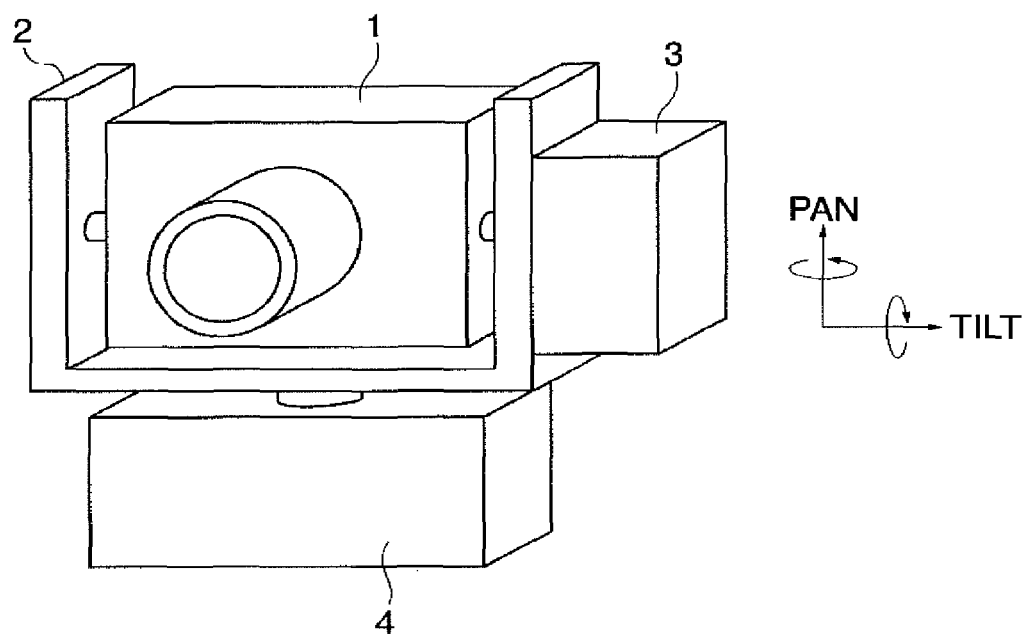
FIG. 2 is an external perspective view of a camera device in the automatic-tracking camera apparatus in FIG. 1.

FIG. 1 is a block diagram showing the configuration of an automatic-tracking camera apparatus according to a first embodiment of the present invention. This automatic-tracking camera apparatus is comprised of a camera device 51. FIG. 2 is an external perspective view of the camera device 51 in the automatic-tracking camera apparatus in FIG. 1.

As shown in FIG. 1, the camera device 51 is connected to a first controller 52 via a second controller 53. An encoder 54 is connected to the camera device 51. The encoder 54 is connected to the first controller 52 and the second controller 53, and the second controller 53 via a speed detector 55.

The camera device 51 acquires images in a constant sampling cycle (cycle of image acquisition). The camera device 51 is configured such that it can be rotated by a motor, and the direction thereof (position/attitude) is detected by the encoder 54 such as an angle sensor. A detection signal from the encoder 54 is converted into a speed signal by the speed detector 55 and provided for the second controller 53. The detection signal from the encoder 54 is also provided for the first controller 52 and the second controller 53 as a position signal indicating the direction of the camera device 51. Further, an image signal obtained by imaging by the camera device 51 is provided for the first controller 52.

The first controller 52 extracts a target object (tracking target) from an image from the camera device 51. Then, the first controller 52 sends out a position instruction for causing the camera device 51 to be displaced to the next target position, on the basis of deviation from a target position on the image (for example, the center of the image) and the current position of the camera device 51, to the second controller 53.

The second controller 53 controls the movement speed of the camera device 51 on the basis of information about the position instruction from the first controller 52 and the speed signal from the encoder 54 which has passed through the speed detector 55. The second controller 53 automatically generates a continuous speed profile. That is, the second controller 53 generates a speed profile so that the target position is reached at the next image acquisition timing and the timing speed is calculated from a position of detection of the tracking target in the past, a position of detection of the tracking target in the image for calculating an instruction value, and image sampling time.

According to this speed profile, the camera device 51 is controlled so as to reach a target position at the next-after-next start timing of image acquisition by a camera body 1 as an image pickup unit, as will be described later. Further, the movement speed of the camera device 51 at the next-after-next image acquisition start timing is controlled so as to coincide with a predicted speed of the tracking target at the next-after-next image acquisition start timing. Here, the "next image acquisition start timing" means the time point of starting image acquisition immediately after generation of a speed profile. The "next-after-next image acquisition start timing" means the time point of starting the next image acquisition after the completion of the next image acquisition.

Figure 36:
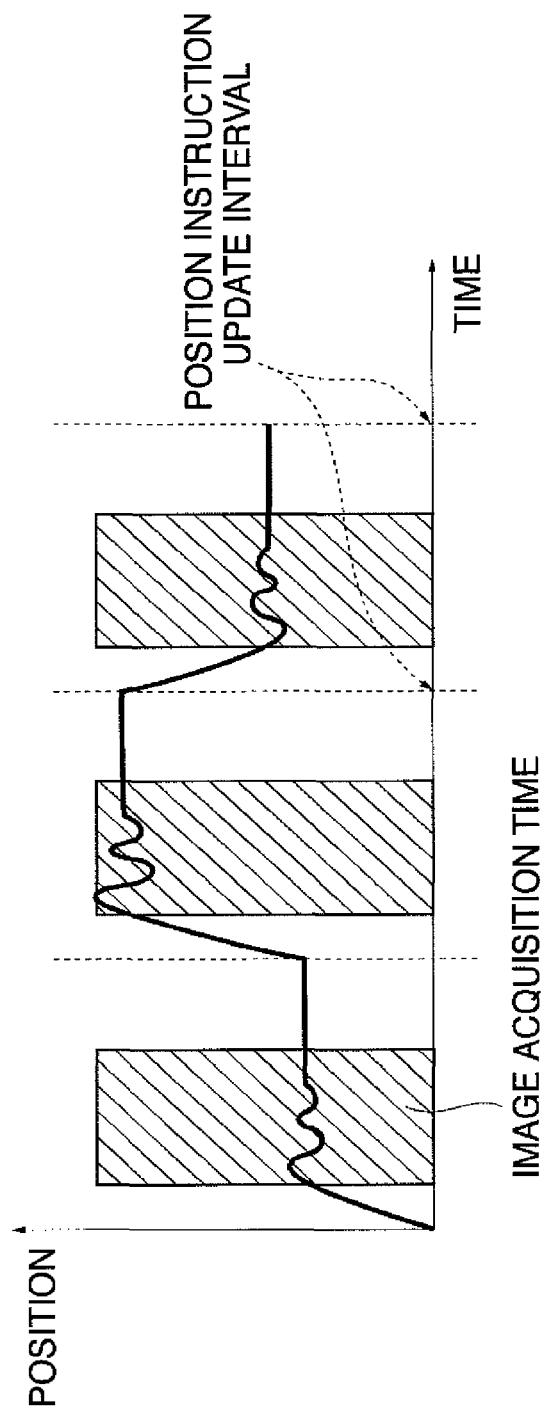
FIG. 36 is a diagram showing the time response of the camera position in the case where driving is performed in the configuration shown in FIG. 35.
Figure 37:
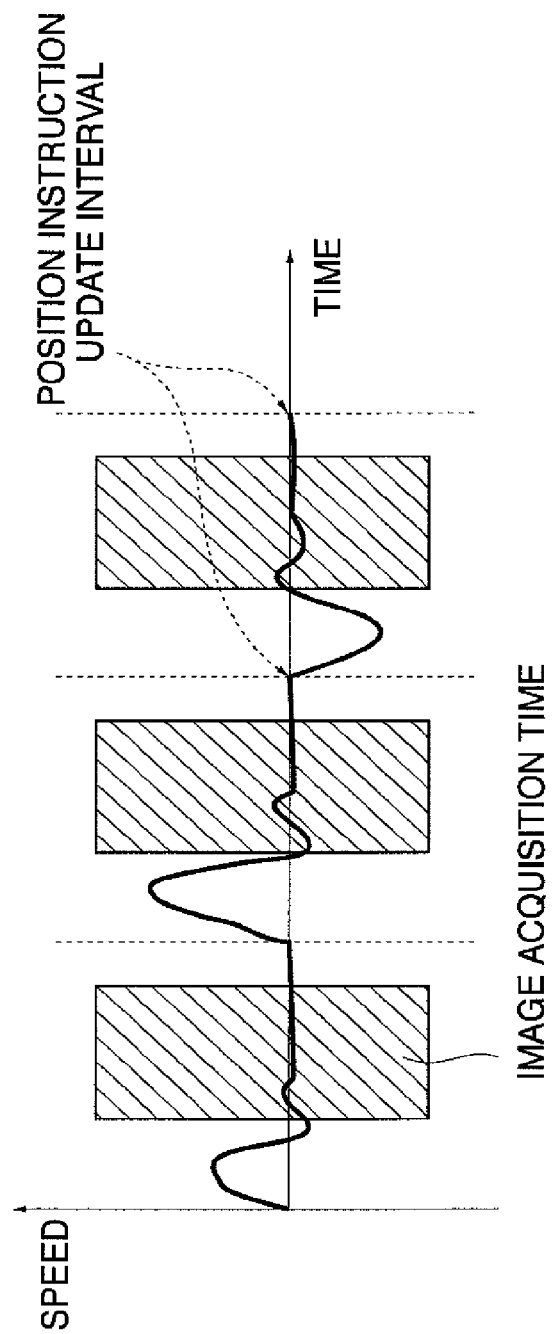
FIG. 37 is a diagram showing the time response of the camera speed in the case where driving is performed in the configuration shown in FIG. 35.
Figure 38:
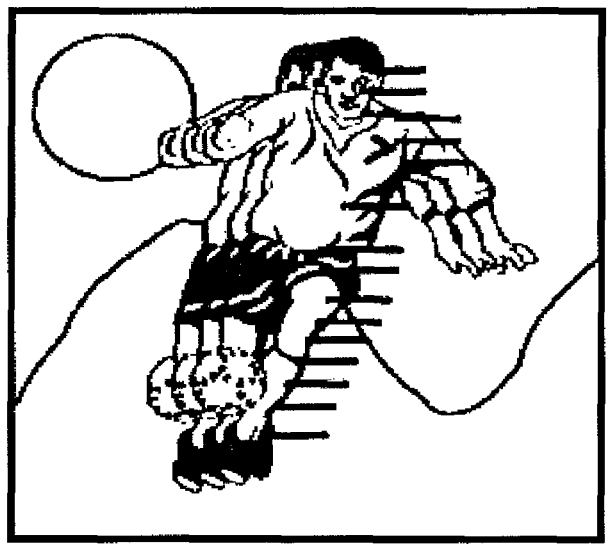
FIG. 38 is a diagram showing an image when a tracking operation under the conventional speed control is performed.
Figure 39:
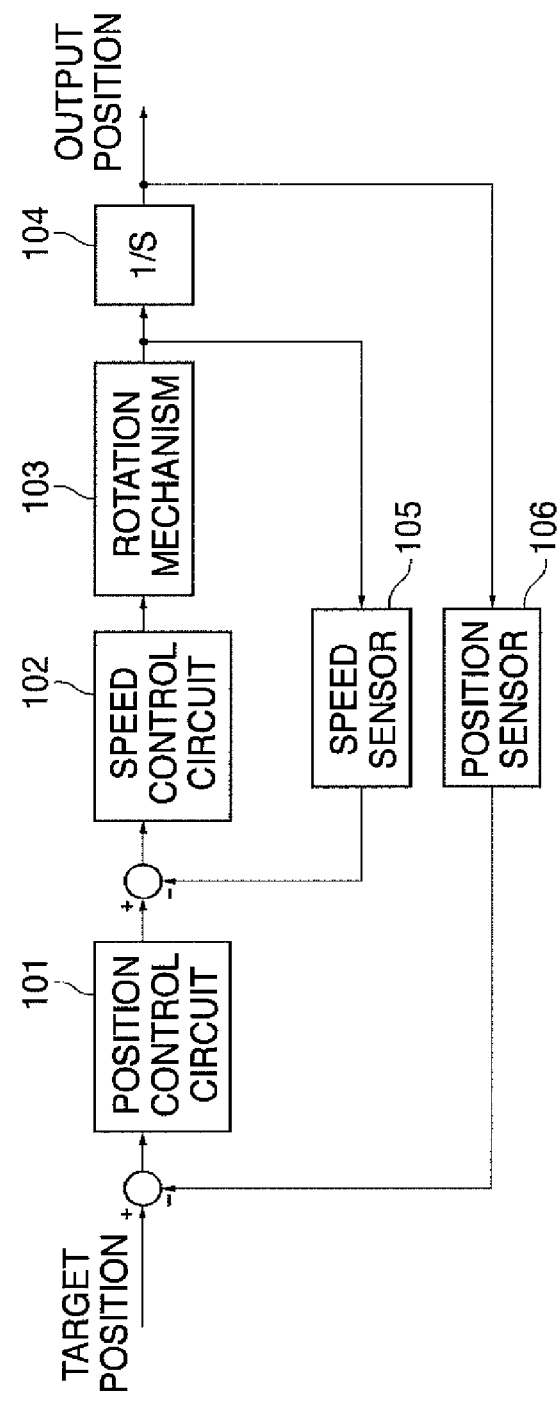
FIG. 39 is a block diagram showing a double-loop control system accompanied by a conventional speed minor loop.
Figure 40:
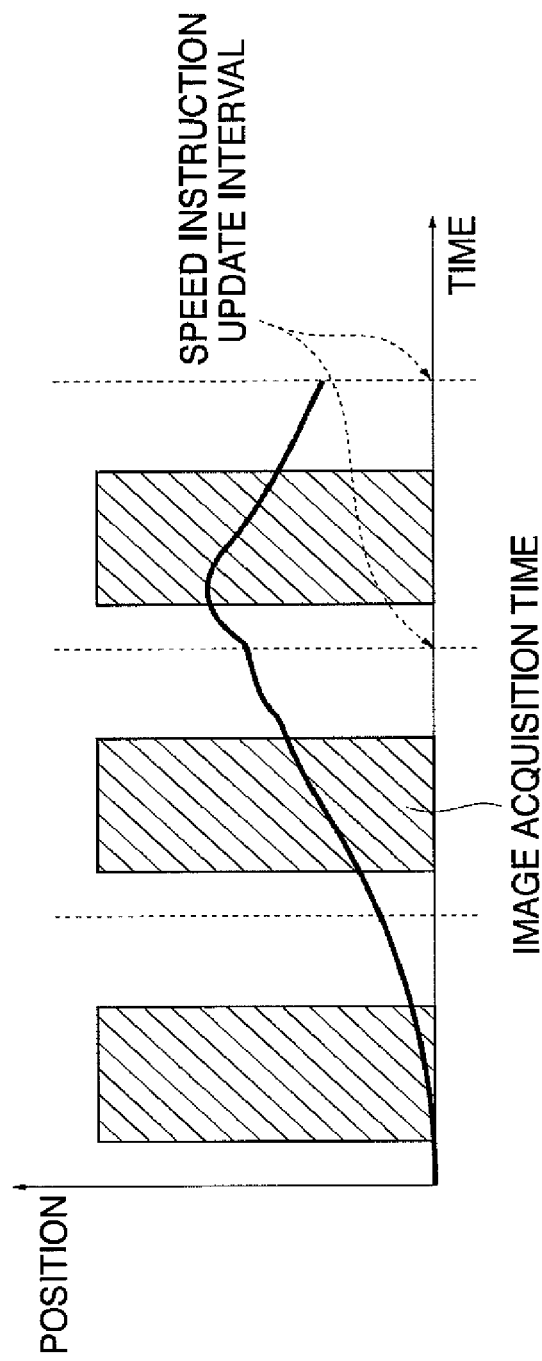
FIG. 40 is a diagram showing the time response of the camera position when a tracking operation under the conventional speed control is performed.

In the present embodiment also, the cycle of generating a position instruction value and the timing of image acquisition by the camera device 51 are synchronized with each other, similarly as shown for the conventional apparatus in FIG. 36 and the like. Further, it is assumed that an image acquisition period exists between the current and next position instruction value generation timings. Here, the image acquisition period means the time during which a shutter, not shown, is opened and an image pickup element such as a CCD is exposed.

Next, the hardware configuration of the automatic-tracking camera apparatus will be described.

As shown in FIG. 2, the camera body 1 of the camera device 51 is supported by a gimbal device 2, and its position/attitude can be changed by pan and tilt driving. The camera body 1 is configured such that it can rotate in the tilt direction relative to the gimbal device 2, and the camera body 1 is driven to rotate around the tilt axis by a tilt axis driving mechanism 3. The tilt axis driving mechanism 3 includes an actuator, a transmission mechanism such as a gear, an angle sensor and the like. The gimbal device 2 is rotatably displaced in a panning direction by a panning axis driving mechanism 4. The panning axis driving mechanism 4 includes an actuator for driving rotation of the gimbal device 2 around the panning axis, a transmission mechanism such as a gear, and an angle sensor.

Figure 3:
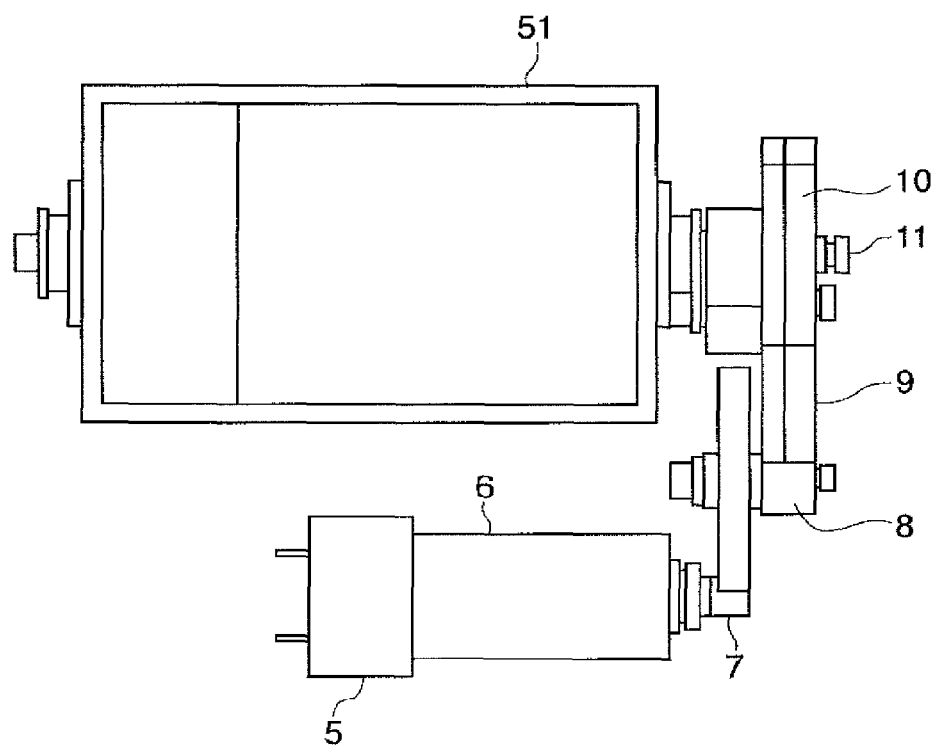
FIG. 3 is a diagram showing the detailed configuration of the tilt axis driving mechanism of the camera device in FIG. 2.
Figure 4:
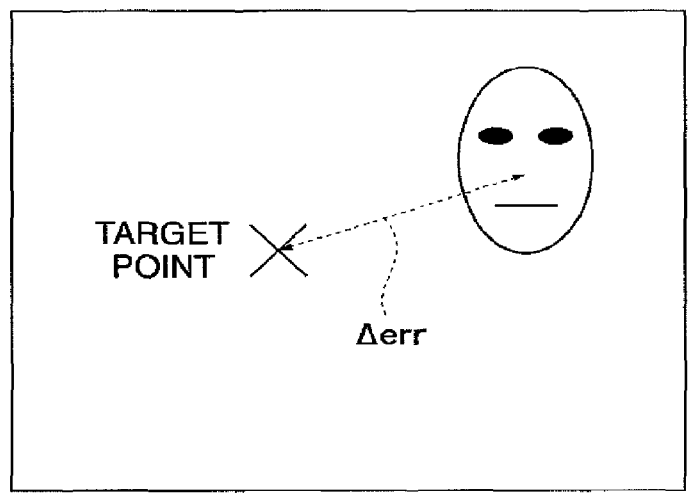
FIG. 4 is a diagram showing deviation between a target position on an image and a target object.

FIG. 3 is a diagram showing the detailed configuration of the tilt axis driving mechanism 3 of the camera device 51 in FIG. 2. As shown in FIG. 3, the tilt axis driving mechanism 3 has a rotary motor 6, a rotary encoder 5 for detecting the rotation angle of the rotary motor 6, a row of reduction gears 7, 8, 9 and 10, and a rotation axis 11 for connecting the camera body 1 and the gear 10 with each other. The turning force generated by the rotary motor 6 is reduced to be an appropriate value by the row of reduction gears 7 to 10, transmitted to the camera body 1, thereby causing the camera body 1 to rotate. In this case, an angle corresponding to the camera rotation angle multiplied by the reduction ratio is detected by the rotary encoder 5. By controlling the voltage and on/off of the rotary motor 6 on the basis of the corresponding angle, the camera rotation angle can be controlled.

Though the panning axis driving mechanism 4 is not shown, the configuration thereof is basically the same as that of the tilt axis driving mechanism 3 except that the driving target is not the camera body 1 but the gimbal device 2 and that the rotation direction is the panning direction.

Next, the first controller 52 will be described. The first controller 52 shown in FIG. 1 acquires an image from the camera body 1 of the camera device 51, extracts a target object to be tracked (here, a person's face) from the image, and calculates a deviation Δerr from a target position. The gravity characteristic point (for example, the tip of a nose or the like) in the image area is regarded as the position of the target object.

The first controller 52 further acquires position information about the camera body 1, from the encoder 54. Then, the first controller 52 calculates the next target position (the target position of the camera body 1 at the next-after-next start timing of image acquisition by the camera body 1) on the basis of the position information and sends it out to the second controller 53 as a position instruction.

Figure 5:
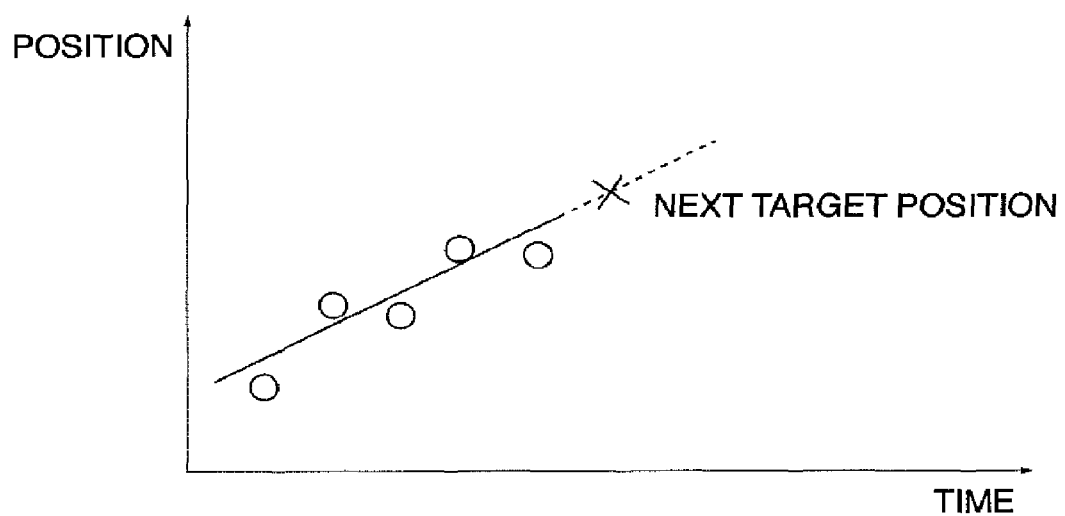
FIG. 5 is a diagram illustrating a method for determining the next target position by linear prediction.

Here, as the method for extracting a target object, form recognition, pattern recognition, a method using color information and the like are conceivable. As for the calculation of the target position, there is also a method in which such a value that causes the current deviation to become zero is simply set for the detected position. However, the image acquisition time and the target object extraction time are often not sufficiently short for the movement speed of the target object, and therefore, the next target position is calculated with the use of prediction. For example, as shown in FIG. 5, a method is used in which linear prediction from points detected in the past is performed to determine a predicted point of later image sampling, as shown in FIG. 5. In this way, consideration is made so that the follow-up performance does not deteriorate even if sampling is slow.

Figure 6:
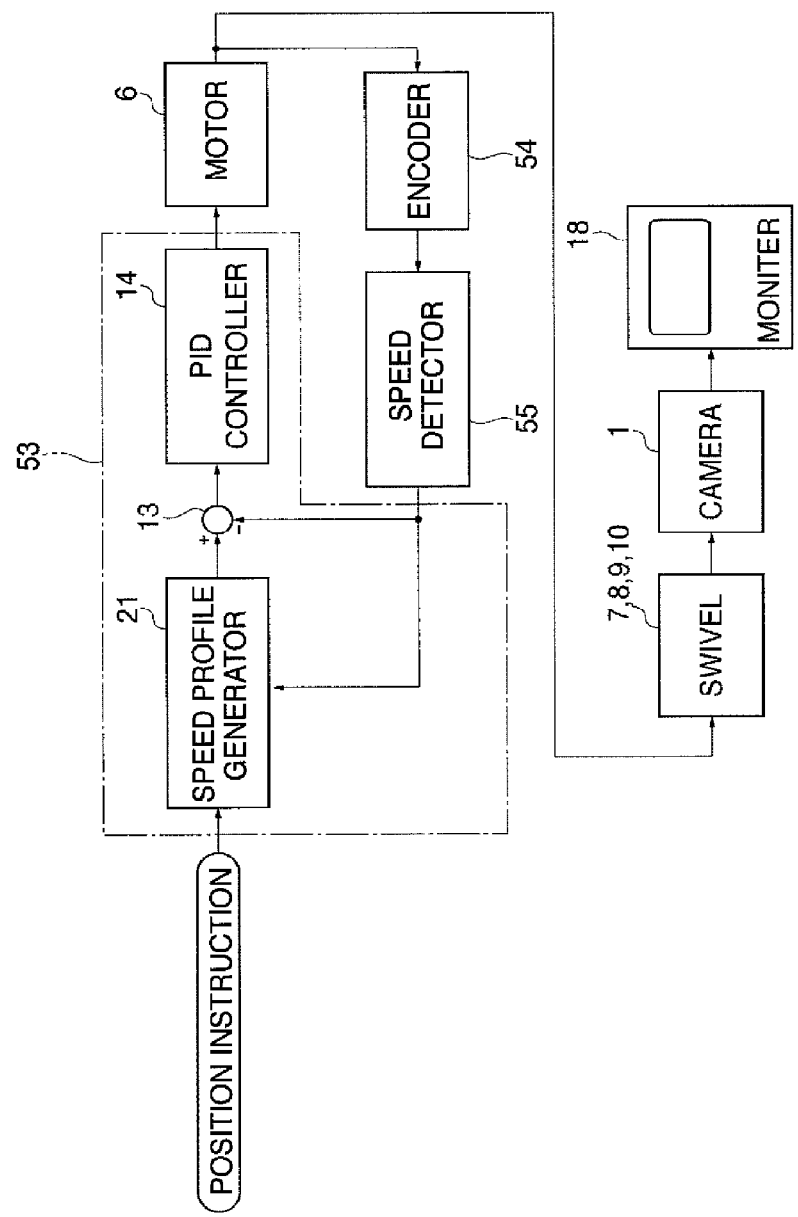
FIG. 6 is a block diagram showing a second controller and related elements thereof.

Next, the second controller 53 will be described. FIG. 6 is a block diagram showing the second controller 53 and related elements thereof.

As shown in FIG. 6, the second controller 53 includes a speed profile generator 21, a subtractor 13 and a PID controller 14 as control units. The speed profile generator 21 automatically generates the continuous speed profile described above. A detection signal from the encoder 54 is converted into a speed signal by the speed detector 55 performing differential operation of the detection signal from the encoder 54 and then inputted to the subtractor 13. The subtractor 13 calculates a deviation between a target value in accordance with the speed profile generated by the speed profile generator 21 and the speed signal inputted from the speed detector 55.

The PID controller 14 performs proportional-plus-integral-plus-derivative operation of the output from the subtractor 13 to generate a signal for driving the rotary motor 6. An image is transferred to a monitor device 18 from the camera body 1 so that it can be referred to from outside.

In general, in comparison with the image sampling cycle of the camera or the processing time for extracting a target object from an image, the speed of the loop of the components 13→14→6→54→55→13→ . . . is dozens to thousands of times faster. Therefore, there are dozens to thousands of chances to perform control before the position instruction is updated. Accordingly, it is possible to perform more detailed control during this period. In the present embodiment, speed control is performed during this period.

Figure 7:
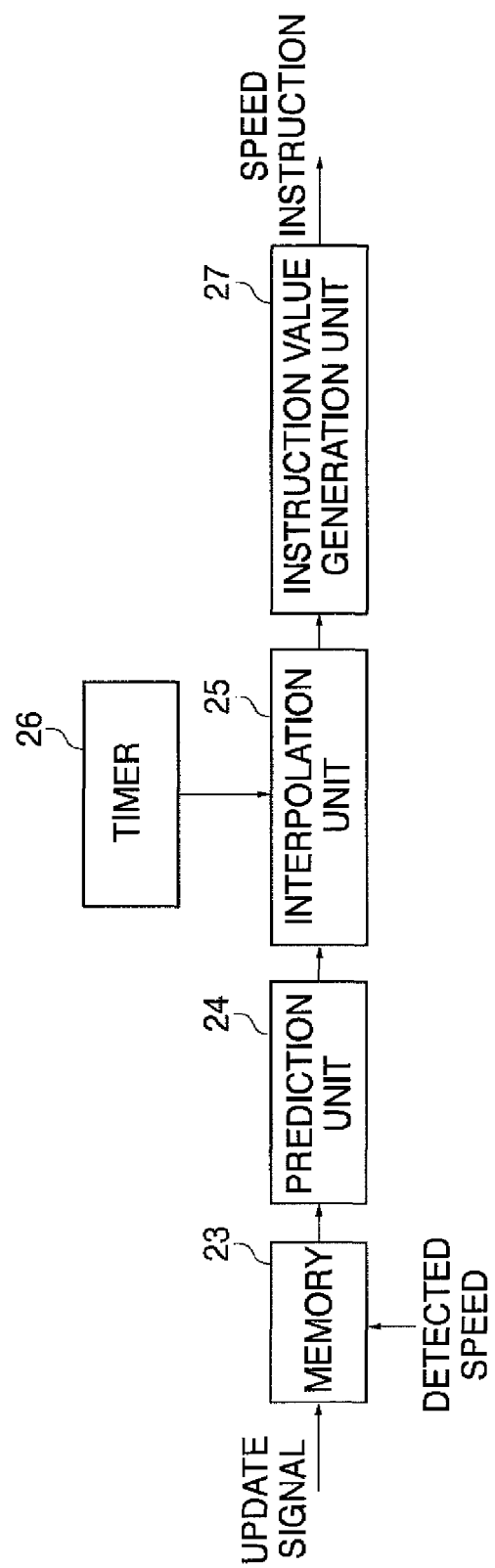
FIG. 7 is a block diagram showing the configuration of a speed profile generator.

Next, the operation of the speed profile generator 21 will be described in detail. FIG. 7 is a block diagram showing the configuration of the speed profile generator 21.

As shown in FIG. 7, the speed profile generator 21 includes a memory device 23, a prediction unit 24, an interpolation unit 25, an instruction value generation unit 27, and a timer 26.

First, a speed signal is inputted to the speed profile generator 21 shown in FIG. 6 from the speed detector 55. Further, position information about a tracking target object, which is detected from an image when the position instruction is updated, is inputted from the encoder 54 and inputted to the memory device 23.

The memory device 23 shown in FIG. 7 holds a predetermined number of update signals in the past, that is, a predetermined number of pieces of position information in the past about a tracking target object detected from an image when the position instruction is updated, and a predetermined number of movement speeds of the tracking target object in the past calculated from an inputted speed signal.

The movement speed v of a tracking target can be determined from the following formula.

$$v = f\left(\frac{P_n - P_{n-1}}{\Delta t}\right) - V_c$$

Here, "$P_n$" represents the position of a target object on an image at time n, and "$P_{n-1}$" represents the position of the target object at the time of immediately previous sampling (time $\Delta t$ before). "Vc" represents the detected speed of the camera body 1, and "f( )" is a conversion function for conversion from coordinates on an image to the position coordinates of the camera body 1.

In this way, the prediction unit 24 predicts the speed of the tracking target object at the next-after-next image acquisition start timing using the held information about the position and speed of the target object. For example, a linear prediction method similar to the linear prediction method shown in FIG. 5 can be used as the prediction method to be used here. Further, if modeling of a target to be controlled is possible, it is possible to make a prediction using a Kalman filter technique or the like. The interpolation unit 25 determines a value corresponding to a predetermined control cycle interval generated by the timer 26, by interpolation on the basis of the value predicted as described above.

Figure 8:
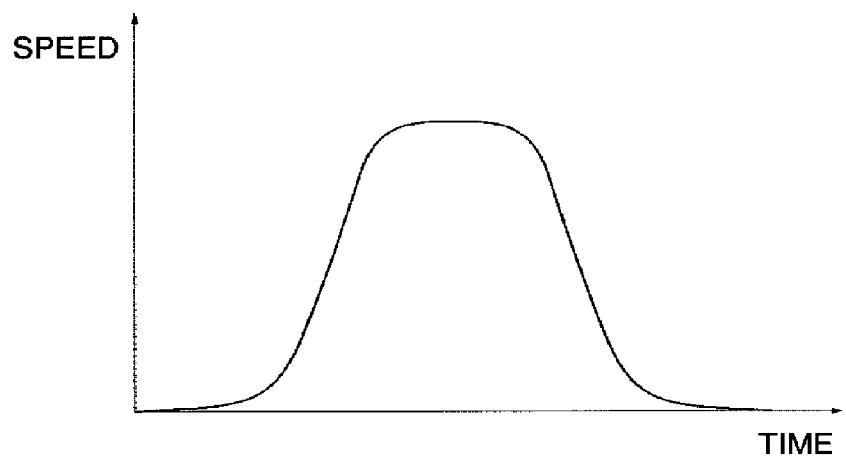
FIG. 8 is a diagram illustrating the movement pattern of a natural object such as a person.
Figure 41:
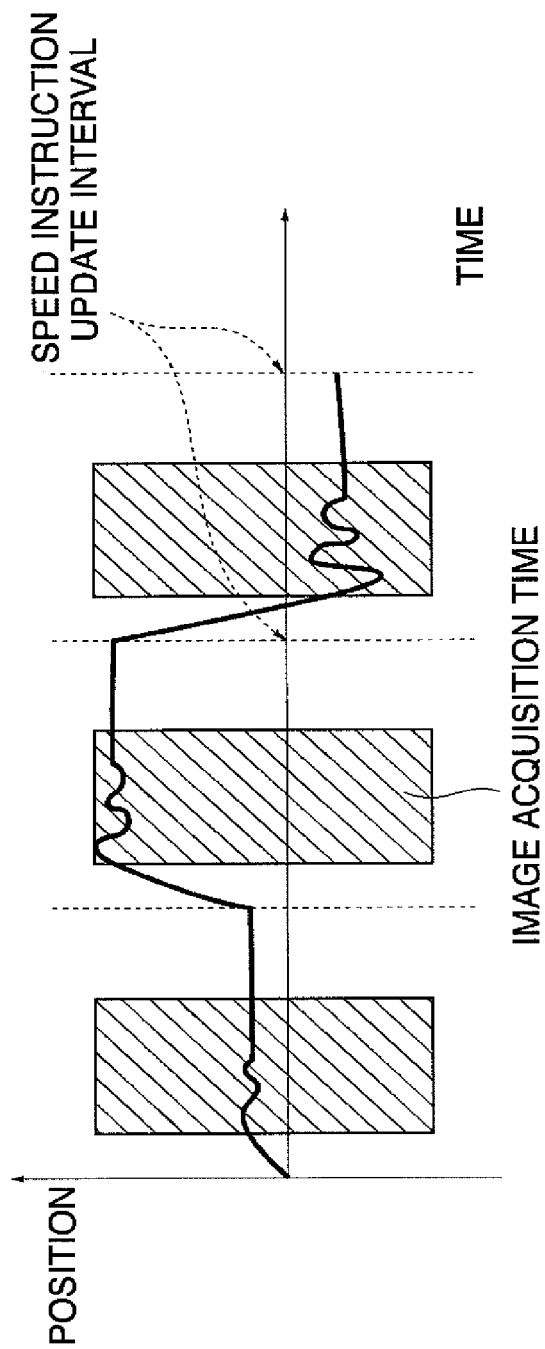
FIG. 41 is a diagram showing the speed response of the camera when a tracking operation under the conventional speed control is performed.
Figure 42:
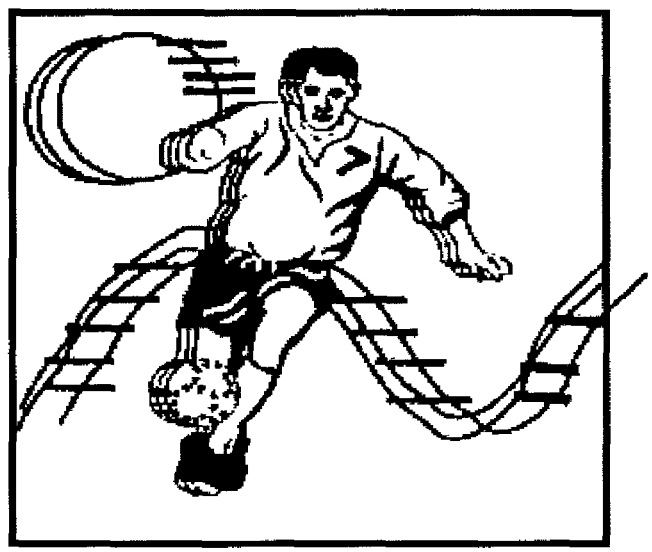
FIG. 42 is a diagram showing an image when a tracking operation under the conventional speed control is performed.

It is generally known that, the movement pattern of a natural object such as a person shows movement with little acceleration change, as shown in FIG. 8. Therefore, the movement under the conventional speed control as shown in FIG. 41 is not smooth. For example, in the case of tracking a person by a video camera, an observer is given an uncomfortable feeling.

Figure 9:
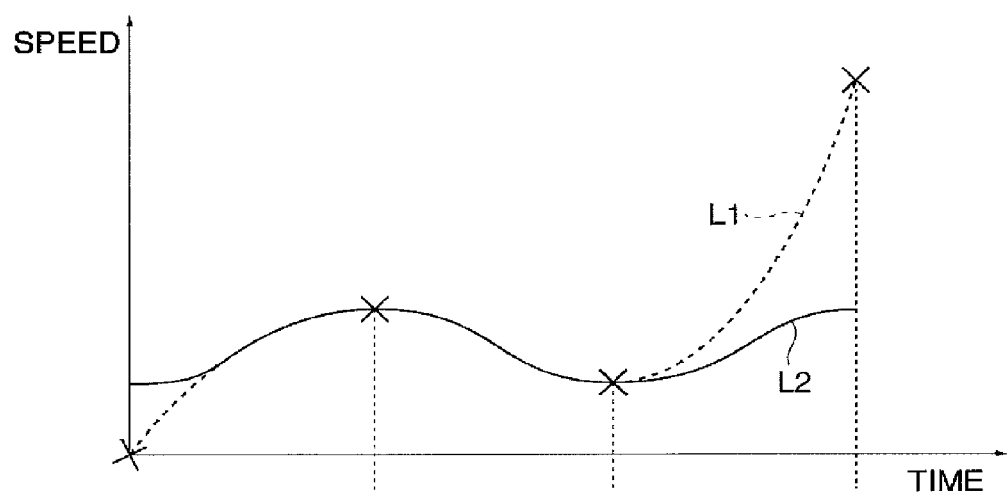
FIG. 9 is a diagram showing speed response under speed control in the case of constant acceleration gain.
Figure 10:
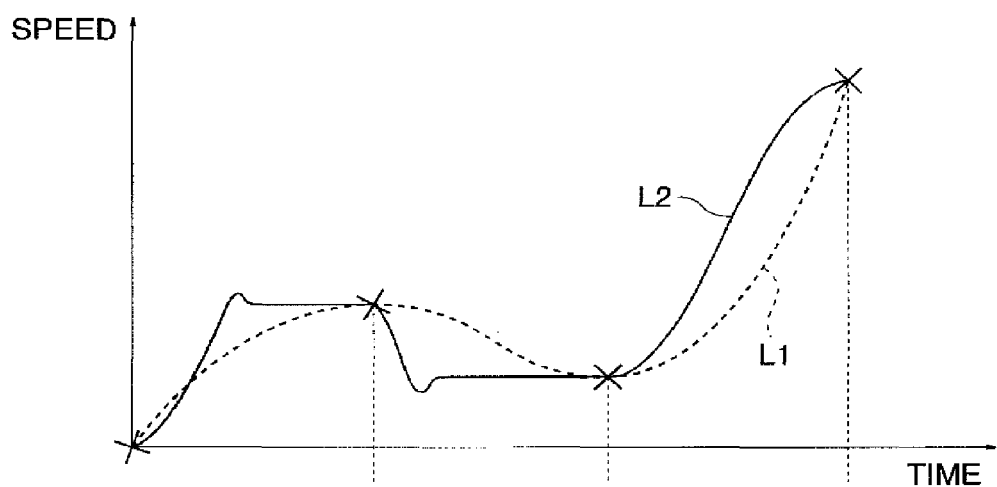
FIG. 10 is a diagram showing speed response under speed control in the case of constant acceleration gain.

FIGS. 9 and 10 are diagrams showing speed response under speed control in the case of constant acceleration gain. In FIGS. 9 and 10, the X points indicate the points where the speed of a target object is predicted each time the target position is updated. A dotted curved line L1 indicates the speed locus of the target object, and a solid curved line L2 indicates the speed locus of the camera.

In speed control, the acceleration gain is constant. Therefore, if, for example, the gain is adjusted when the speed changes little, as shown in FIG. 9, it is not possible to follow a significant speed change. Consequently, a tracking target moving at a high speed is difficult to track and is missed. On the other hand, if the gain is adjusted when the speed changes much, as shown in FIG. 10, it is possible to track even a target object moving at a high speed. However, since the acceleration changes much, the movement is not smooth.

Figure 11:
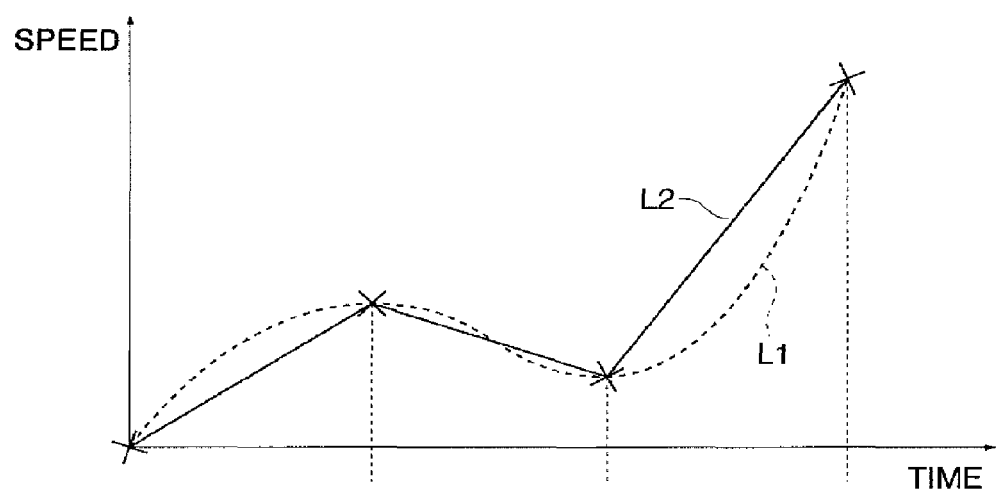
FIG. 11 is a diagram showing speed response under speed control in the present embodiment.

The acceleration of the movement of a natural object can be considered to be constant during a sufficiently short time period. Accordingly, in the present embodiment, interpolation is set so that acceleration is made until the next target speed is reached, with all the position detection and image sampling time spent, as shown in FIG. 11. That is, driving control of the tilt axis driving mechanism 3 and the panning axis driving mechanism 4 is performed so that the camera body 1 is accelerated uniformly between the next image acquisition start timing and the next-after-next image acquisition start timing.

Figure 12A:
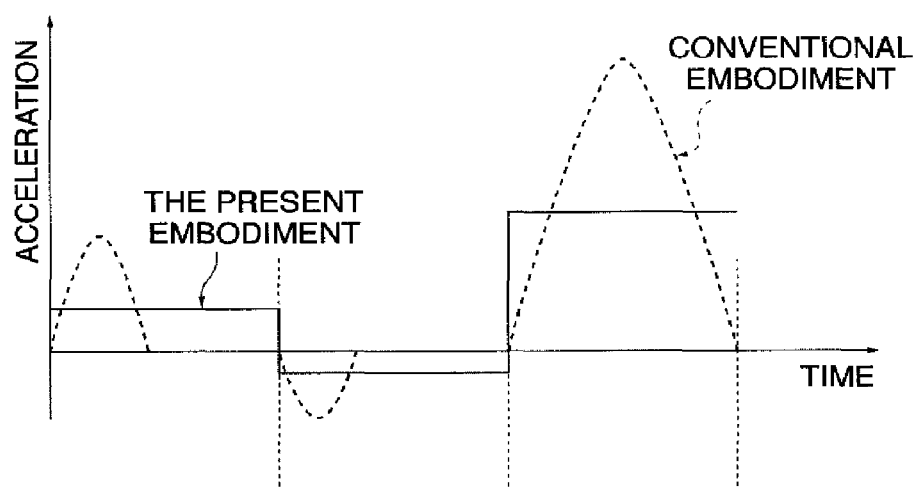
FIG. 12A is a diagram showing acceleration response under speed control in the present embodiment.

As a result, smoother movement with less acceleration change in comparison with a conventional embodiment, can be realized as shown in FIG. 12A. That is, the camera body 1 moves with an almost constant acceleration, between adjacent image acquisition start timings. Further, since the movement of the camera body 1 is more close to the movement of a natural object, there is a higher probability that difference between the speed loci is little in comparison with a conventional example. Accordingly, the accumulated value of speed deviations, that is, position variation is little, and the possibility of missing a target object is reduced.

Figure 12B:
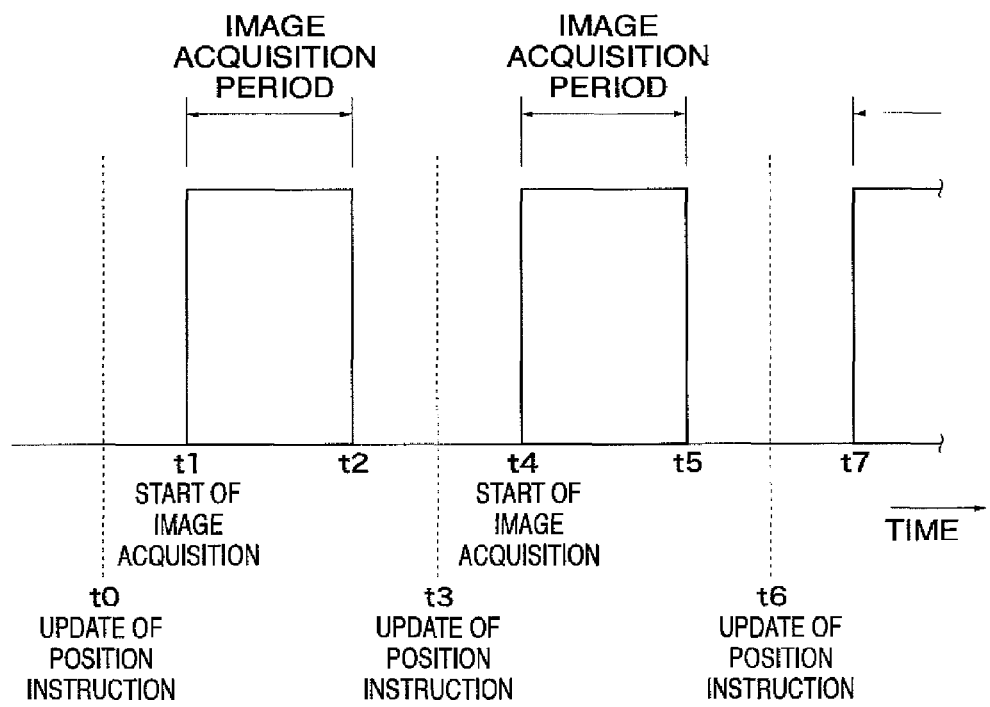
FIG. 12B is a time chart for illustrating the content of the control in the present embodiment.

The control described above will be summarized with reference to FIG. 12B. In FIG. 12B, the axis of abscissas indicates lapse of time. The dotted axes of ordinates indicate timings of updating a position instruction (t0, t3 and t6). The image acquisition period is the period from the acquisition start time point (t1, t4 and t7) to the acquisition end time point (t2 and t5).

First, at the time point t0, the target position of the camera body 1 at the time point t4 is generated and updated (target position: Xt4), and, at the time point t3, the target position of the camera body 1 at the time point t7 is updated (target position: Xt7).

Further, at the time point t0, the movement speed of a tracking target at the time point t4 is predicted (predicted speed: Vt4), and, at the time point t3, the movement speed of the tracking target at the time point t7 is predicted (predicted speed: Vt7).

Then, during the period from the time point t1 to the time point t4, the camera body 1 is controlled with a constant acceleration. Furthermore, the constant acceleration is set so that the camera body 1 reaches the target position Xt4 at the time point t4, and the speed of the camera body 1 at the time point t4 coincides with the predicted speed Vt4 of the tracking target. Actually, a speed profile which realizes such speed control is generated.

According to the present embodiment, it is possible to realize continuous and smooth driving and obtain an image with little position variation of a tracking target from a target position within the image and with little blur.

FIG. 13 is a block diagram showing the configuration of a speed profile generator in an automatic-tracking camera apparatus according to a second embodiment of the present invention.

In the present embodiment, the configuration of the speed profile generator 21 in the second controller 53 is different from that in the first embodiment. Description will be made with reference to FIG. 13 instead of FIG. 7. The other elements are the same as corresponding ones of the first embodiment.

The speed profile generator 21 in the second embodiment includes a prediction unit 28, a speed control instruction unit 30, an acceleration maintaining unit 31, an instruction value generation unit 33, a timer 29, and an image acquisition synchronization signal generation unit 32.

The prediction unit 28 predicts the speed at the time when a target object is detected next. On the basis of the result of the prediction, the speed of the camera body 1 is gradually increased to reach the target speed by the speed control instruction unit 30. After that, when a synchronization signal is inputted to the acceleration maintaining unit 31 from the image acquisition synchronization signal generation unit 32, an acceleration instruction at the time point when the synchronization signal was inputted first, that is, the speed increase rate is kept constant until the synchronization signal disappears. In this way, output of a speed instruction or an instruction to maintain acceleration is inputted to the instruction value generation unit 33 to perform speed control of the rotation of the camera body 1. This operation is shown as a time chart in FIG. 14.

Figure 14:
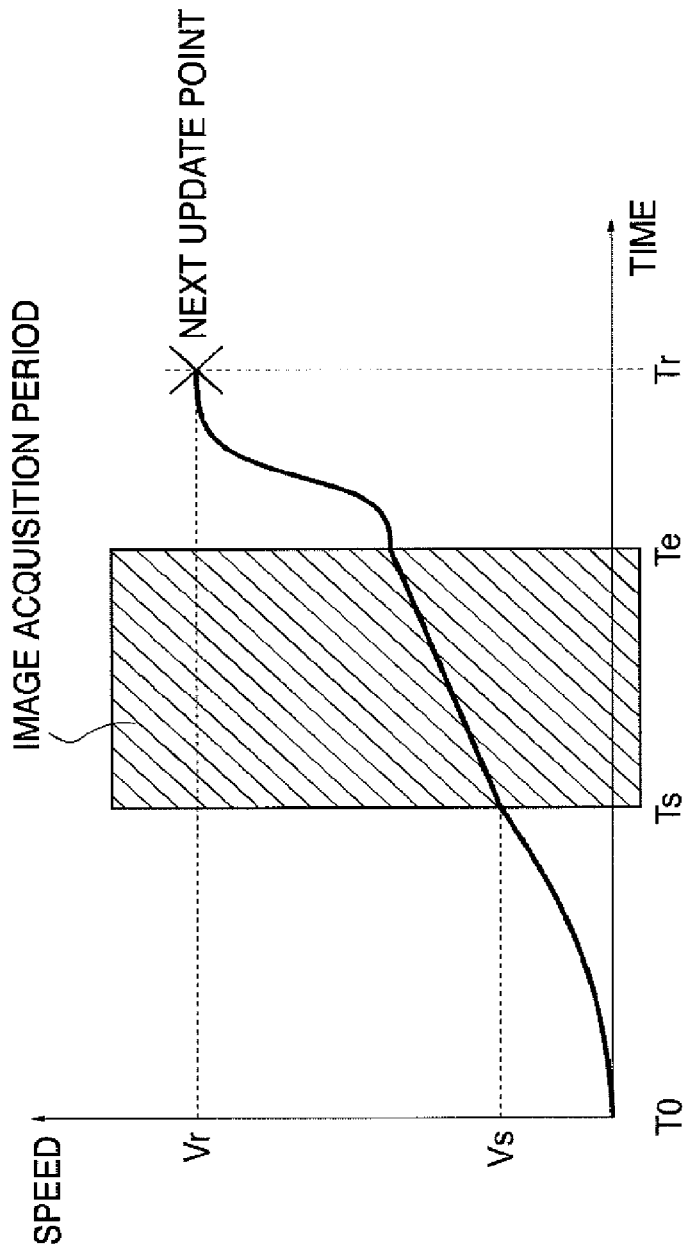
FIG. 14 is a time chart showing a speed profile.

As shown in FIG. 14, the acceleration of the camera body 1 is gradually increased to gradually increase the speed during the period from the position instruction value generation timing T0 to the image acquisition start time point Ts immediately after the timing T0. During this period, speed control is performed with the predicted speed Vr of the tracking target at the next position instruction value generation timing Tr as a target speed, and interpolation is not performed. During this period, the gain is adjusted to be low so that the target speed is not reached too early.

Then, during the image acquisition period (from Ts to Te), interpolation points are caused to occur to keep the acceleration at the image acquisition start time point Ts. Since the acceleration is kept constant, the speed change is linear. As a result, the movement of the camera body 1 during the image acquisition period resembles that of a natural object, and therefore, the probability that blur is reduced becomes high.

Then, during the period from the image acquisition end time point Te to the next position instruction value generation timing Tr, speed control is performed with the predicted speed Vr as a target, and interpolation is not performed. In the time periods other than the image acquisition period, some degree of freedom is allowed. For example, the freedom of slightly adjusting the speed of the camera body 1 before the target object is detected and the target position is updated next after the image acquisition period ends is allowed.

Though the method using an image acquisition synchronization signal has been shown in the configuration of FIG. 13, this is not limitative. For example, if the timing of image acquisition and the operation of extracting a target object and updating the next position instruction are synchronized with each other in advance, and the image acquisition start time point Ts and the image acquisition end time point Te are known, then the acceleration maintaining unit 31 may be operated using the timer 29.

Figure 15:
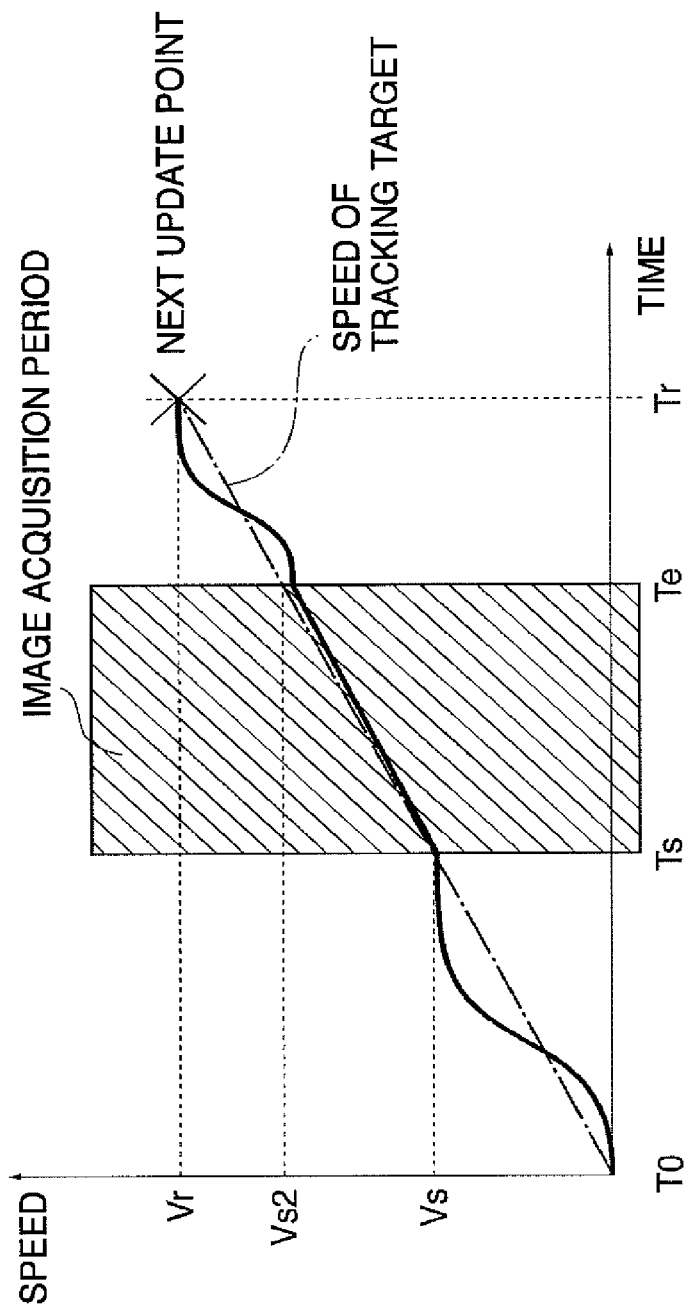
FIG. 15 is a time chart showing a speed profile.

First, as shown in FIG. 15, the speed Vs of the tracking target at the image acquisition start time point Ts is predicted, and, during the period from the position instruction value generation timing T0 to the image acquisition start time point Ts immediately after the timing T0, speed control is performed so that the speed of the camera body 1 becomes the speed Vs at the time point Ts (without interpolation points). When image acquisition is started, the acceleration maintaining unit 31 is caused to operate during the image acquisition period (from Ts to Te) to keep the acceleration constant. Here, the acceleration at the time point Ts is not kept but the acceleration calculated from $(Vs2-Vs)/(Te-Ts)$ is kept to maintain constant acceleration (interpolation points are caused to occur).

Next, when the image acquisition is completed, speed control is performed with the predicted speed Vr of the tracking target at the next position instruction update (Tr) as a target speed. Thereby, the speed control time period (the period from the time point Te to the time point Tr in FIG. 15) plays a role of a buffer, and resistance to disturbance and the like is strengthened.

According to the present embodiment, advantages similar to the advantages of the first embodiment can be obtained. In addition, it is possible to obtain an image which is not significantly affected by disturbance and the like.

Figure 16:
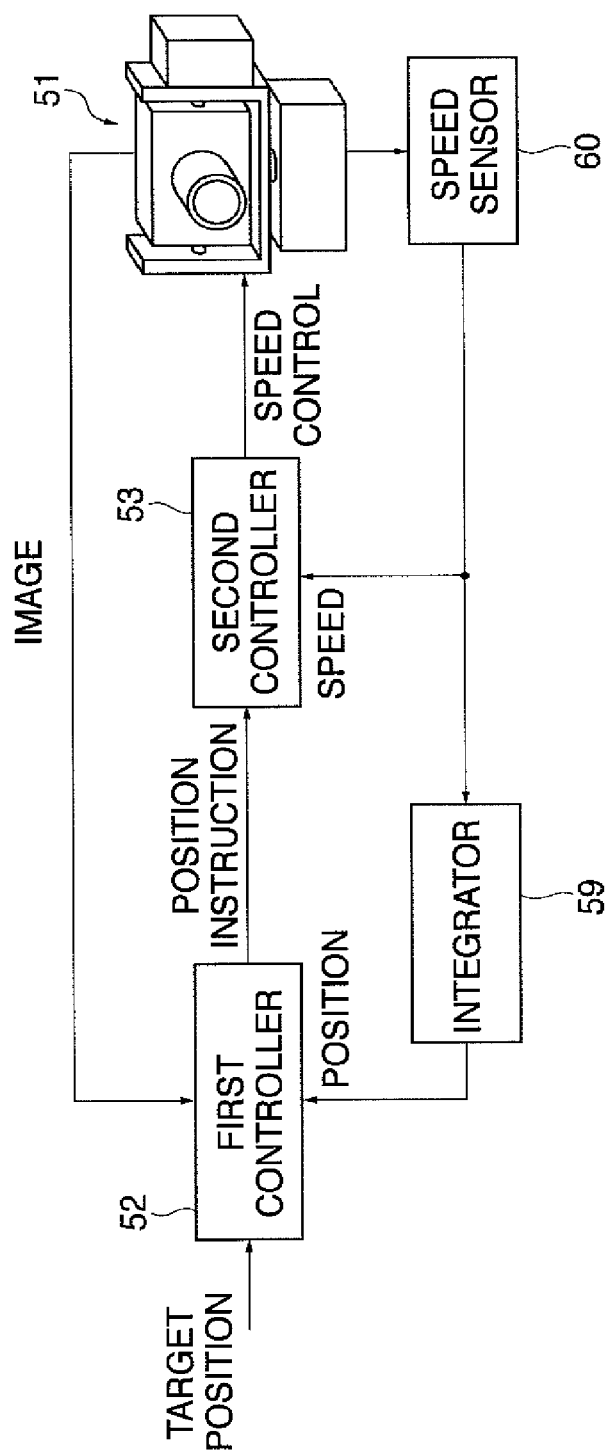
FIG. 16 is a block diagram showing the configuration of an automatic-tracking camera apparatus according to a third embodiment of the present invention.

FIG. 16 is a block diagram showing the configuration of an automatic-tracking camera apparatus according to a third embodiment of the present invention.

In the present embodiment, the encoder 54 and the speed detector 55 are eliminated from the configuration of the first embodiment (FIG. 1), and a speed sensor 60 and an integrator 59 are provided instead. The other elements are the same as corresponding ones of the first embodiment.

Output from the speed sensor 60 is fed back to the first controller 52 via the integrator 59. There are various kinds of speed sensors, and a tachogenerator or a gyro sensor can be used as the speed sensor 60. The contents of the operation by the first controller 52 and the second controller 53 are similar to those in the first embodiment.

According to the present embodiment, advantages similar to the advantages of the first embodiment can be obtained. In addition, since the speed is not calculated from an encoder but directly detected, it is possible to perform control with little delay and more securely in accordance with a speed profile.

Figure 17:
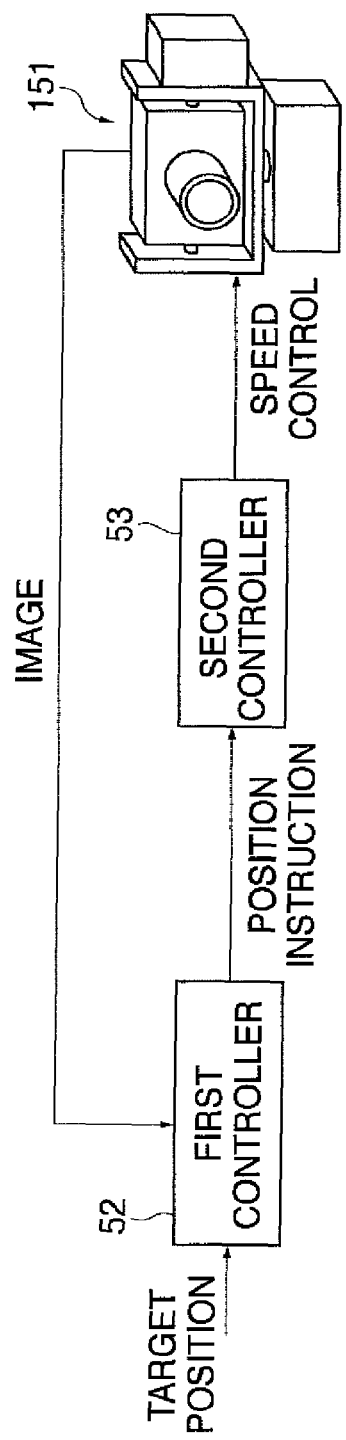
FIG. 17 is a block diagram showing the configuration of an automatic-tracking camera apparatus according to a fourth embodiment of the present invention.

FIG. 17 is a block diagram showing the configuration of an automatic-tracking camera apparatus according to a fourth embodiment of the present invention.

In the present embodiment, a camera device 151 is provided instead of the camera device 51, and the encoder 54 and the speed detector 55 are eliminated, in comparison with the configuration of the first embodiment (FIG. 1). The camera device 151 is different from the camera device 51, and it is configured to be rotated by a stepping motor (not shown) capable of driving the camera device 151 in an angle proportionate to the number of pulses, which is provided as a pan/tilt rotation mechanism instead of the panning axis driving mechanism 4 and the tilt axis driving mechanism 3.

The first controller 52 extracts a target object (tracking target) from an image from the camera device 151, and calculates the current position of the camera device 151 from the number of pulses. Then, the first controller 52 sends out a position instruction for causing the camera device 151 to be displaced to the next target position, on the basis of deviation from a target position on the image (for example, the center of the image) and the current position of the camera device 151, to the second controller 53.

The second controller 53 controls the movement speed of the camera device 151 on the basis of information about the position instruction from the first controller 52. That is, the second controller 53 performs speed prediction similarly to the first embodiment and generates a pulse train to be given to the stepping motor described above.

The other elements and the aspect of control are the same as corresponding ones of the first embodiment.

According to the present embodiment, advantages similar to the advantages of the first embodiment can be obtained. In addition, the configuration can be simplified because a sensor is not required.

In the case of such a camera device using a stepping motor also, it is possible to provide an encoder or a speed sensor therefor to perform feedback control, similarly to the first and second embodiments. In this case, it is possible to respond to fast acceleration because there is no need to worry about loss of synchronization.

Figure 18:
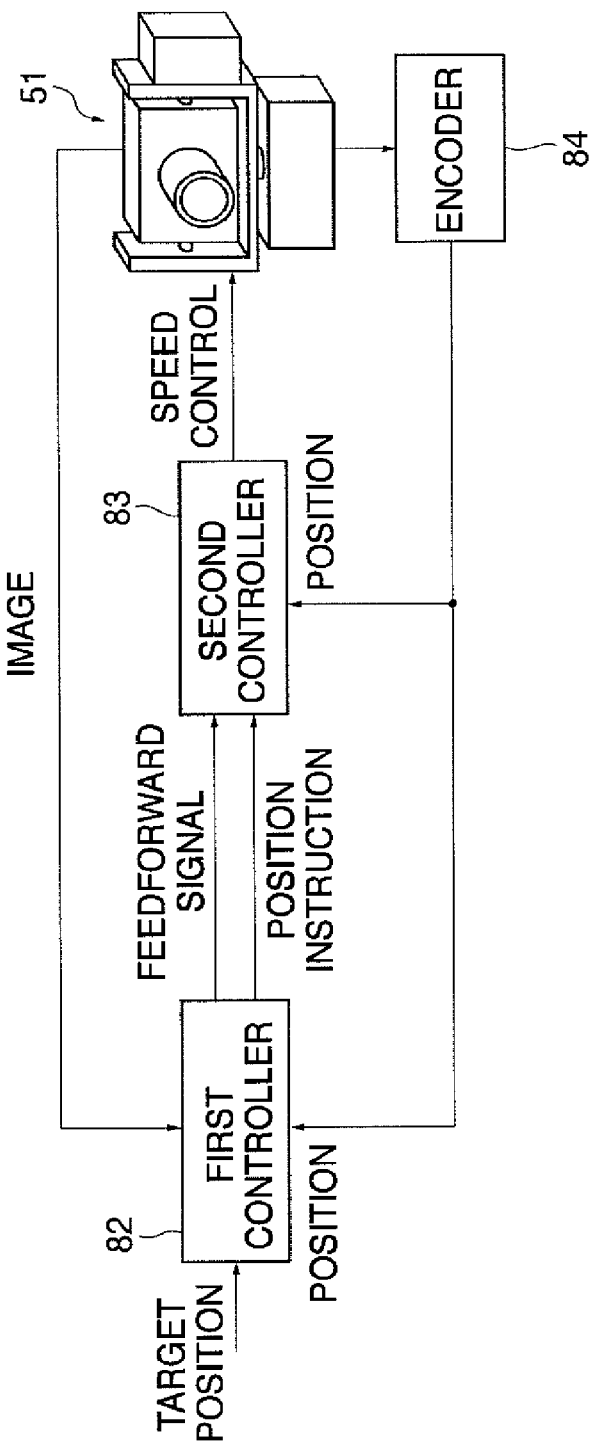
FIG. 18 is a block diagram showing the configuration of an automatic-tracking camera apparatus according to a fifth embodiment of the present invention.

FIG. 18 is a block diagram showing the configuration of an automatic-tracking camera apparatus according to a fifth embodiment of the present invention. In this automatic-tracking camera apparatus, the configuration of the camera device 51 is similar to that in the first embodiment.

The camera device 51 is connected to a first controller 82 via a second controller 83. An encoder 84 is connected to the camera device 51. The encoder 84 is connected to the first controller 82 and the second controller 83.

The encoder 84 is configured by an angle sensor such as a rotary encoder, and it outputs a signal corresponding to a rotation angle. The direction (position/attitude) of the camera device 51 is detected by the encoder 84, and a position signal as the detection signal is provided for the first controller 82 and the second controller 83. Further, an image signal obtained by imaging by the camera device 51 is provided for the first controller 82. The encoder 84 may be any encoder that can grasp the position.

The first controller 82 extracts a target object (tracking target) from an image from the camera device 51. Then, the first controller 82 sends out a position instruction for causing the camera device 51 to be displaced to the next target position, on the basis of deviation from a target position on the image (for example, the center of the image) and the current position of the camera device 51, to the second controller 83. The first controller 82 further sends out a feedforward signal calculated on the basis of the next driving amount of the camera, to the second controller 83.

The second controller 83 controls the angle of the camera device 51 on the basis of the position instruction from the first controller 82 and the position information from the encoder 84.

Figure 19:
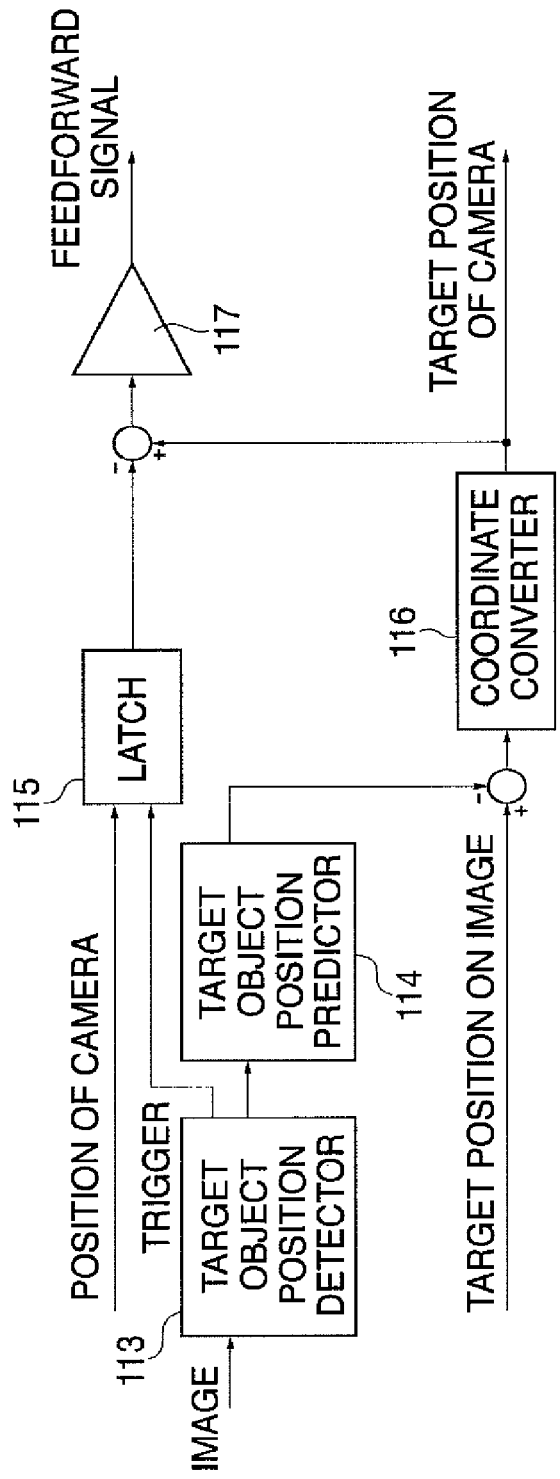
FIG. 19 is a block diagram showing the configuration of a first controller in FIG. 18.

FIG. 19 is a block diagram showing the configuration of the first controller 82 in FIG. 18.

As shown in FIG. 19, in the first controller 82, the position is detected from an inputted image by a target object position detector 113. In this case, when the detection position is updated, a trigger signal occurs, and information about the camera position then is held by a latch 115. Output from the target object position detector 113 is inputted to a target object position predictor 114, and a predicted value at the next sampling time is determined from several points detected in the past as shown in FIG. 5.

Further, deviation between this predicted point and a target position on the image (for example, the center of the screen) is determined, and output converted into camera coordinates by a coordinate converter 116 (that is, a position instruction) is sent out to the second controller 83.

Furthermore, difference between the target position of the camera body 1 and the current position held by the latch 115, that is, the driving amount per sampling is determined. The driving amount is given appropriate gain by a gain device 117 and sent out to the second controller 83 as a feedforward signal.

The gain device 117 multiplies the driving amount by a predetermined value. As this value, such a value is set that movement is made in a driving angle which has been detected in advance, spending full time for one sampling in an experiment or a model calculation, as described later. If the feedforward operation corresponds to a physical quantity which restricts the maximum driving force of an actuator described later, more stable operation is enabled by adding an appropriate offset.

Figure 20:
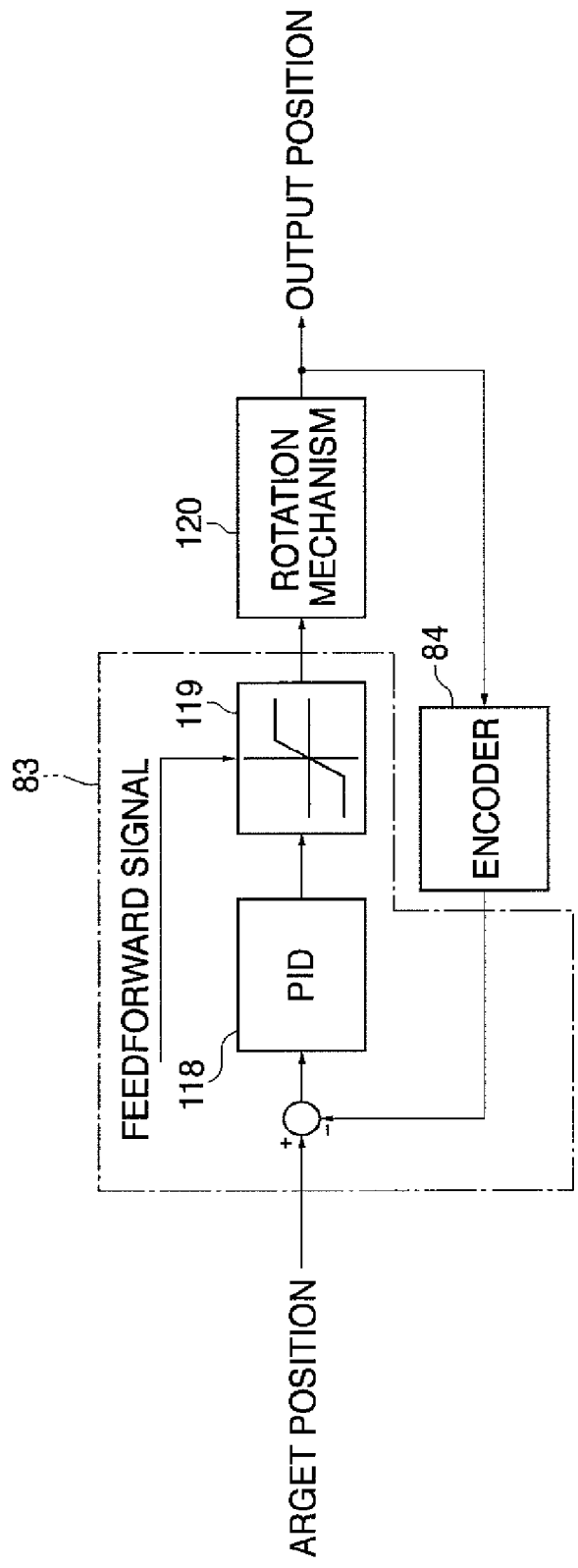
FIG. 20 is a block diagram showing a second controller and related elements thereof.

Next, the second controller 83 will be described. FIG. 20 is a block diagram showing the second controller 83 and related elements thereof.

As shown in FIG. 20, the second controller 83 includes a proportional-plus-integral-plus-derivative controller 118 and a dynamic saturation element 119. The tilt axis driving mechanism 3 and the panning axis driving mechanism 4 correspond to a rotation mechanism 120 (see FIG. 2).

Figure 21:
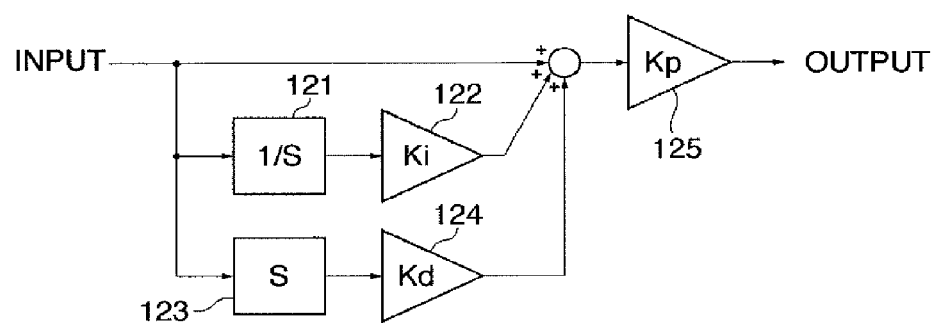
FIG. 21 is a block diagram showing the configuration of a proportional-plus-integral-plus-derivative controller.

FIG. 21 is a block diagram showing the configuration of the proportional-plus-integral-plus-derivative controller 118. The proportional-plus-integral-plus-derivative controller 118 is configured by an integrator 121, a differentiator 123 and gain operation units (multipliers) 122, 124 and 125. "Kp" represents the proportional gain of the gain operation unit 125; "Ki" represents the integral gain of the gain operation unit 122; and "Kd" represents the differential gain of the gain operation unit 124.

The dynamic saturation element 119 changes the saturation value according to feedforward signals. Output from this dynamic saturation element 119 is inputted to the actuator of the rotation mechanism 120, and the rotation mechanism 120 is driven. The position of the rotation mechanism is detected by the encoder 84, and it is controlled to be negatively fed back to the proportional-plus-integral-plus-derivative controller 118 and servo-locked to a target position.

By negatively feeding back the output to the proportional-plus-integral-plus-derivative controller 118, it is possible to make the deviation from the target position zero. The proportional-plus-integral-plus-derivative controller 118 can be replaced with a proportional controller, a proportional derivative controller or a proportional integral controller as required. The selection may be made depending on whether overshoot or remaining deviation is to be allowed.

In general, in comparison with the image sampling cycle of the camera or the processing time for extracting a target object from an image, the processing speed of the loop of the components 118→119→120→84→118→ . . . is dozens to thousands of times faster. Therefore, there are dozens to thousands of chances to perform control before the position instruction is changed. It is possible to perform more detailed control during this period. Accordingly, in the present embodiment, this is utilized to perform position control at a high speed.

Figure 22:
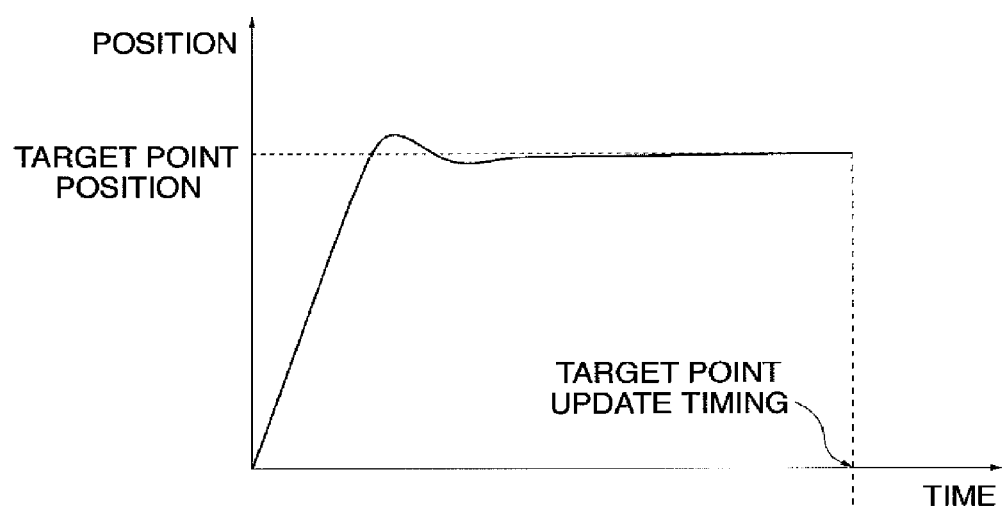
FIG. 22 is a diagram showing control responses of a conventional proportional-plus-integral-plus-derivative controller.

In general, a controller is adapted to converge sufficiently earlier than the target position update cycle, as shown in FIG. 22. Though performing only the feedback control can adjust the initial rise by adjusting the proportional gain, there are problems as shown in FIGS. 23 and 24.

Figure 23:
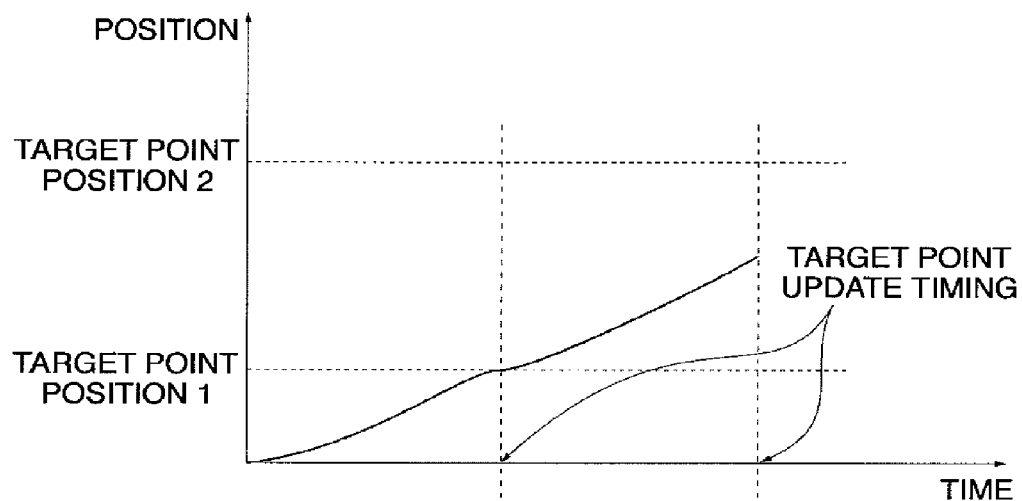
FIG. 23 is a diagram showing responses of position control in the case where gain is adjusted when the driving amount is small in a conventional position control method.
Figure 24:
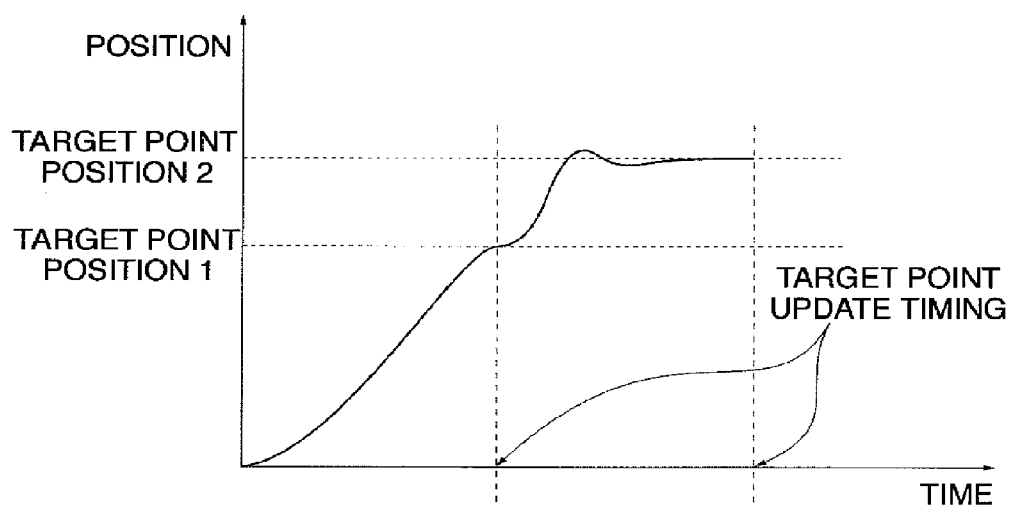
FIG. 24 is a diagram showing responses of position control in the case where gain is adjusted when the driving amount is large in the conventional position control method.

FIG. 23 is a diagram showing responses of position control in the case where gain is adjusted so that driving is continuous when the movement distance is short. FIG. 24 is a diagram showing responses of position control in the case where gain is adjusted so that driving is continuous when the movement distance is long. In the example of FIG. 23, since the target position is not reached when the driving distance is long, the follow-up ability significantly deteriorates. On the other hand, in the example of FIG. 24, the driving shows a discontinuous stop-go movement and is not smooth, and therefore, there is a risk that vibrations or a strange sound occurs. Further, there is a risk that this vibrations causes blur of an image and the accuracy of extracting a target object deteriorates.

In the present embodiment, however, the dynamic saturation element 119 is inserted to the output from the proportional-plus-integral-plus-derivative controller 118, so that the saturation value is controlled with a feedforward amount corresponding to the driving amount during one sampling period. The proportional-plus-integral-plus-derivative controller 118 has been adjusted so that it converges sufficiently earlier than the target position update cycle, as shown in FIG. 22. However, since the output is restricted by the dynamic saturation element 119, the initial stage output is restricted.

Figure 25:
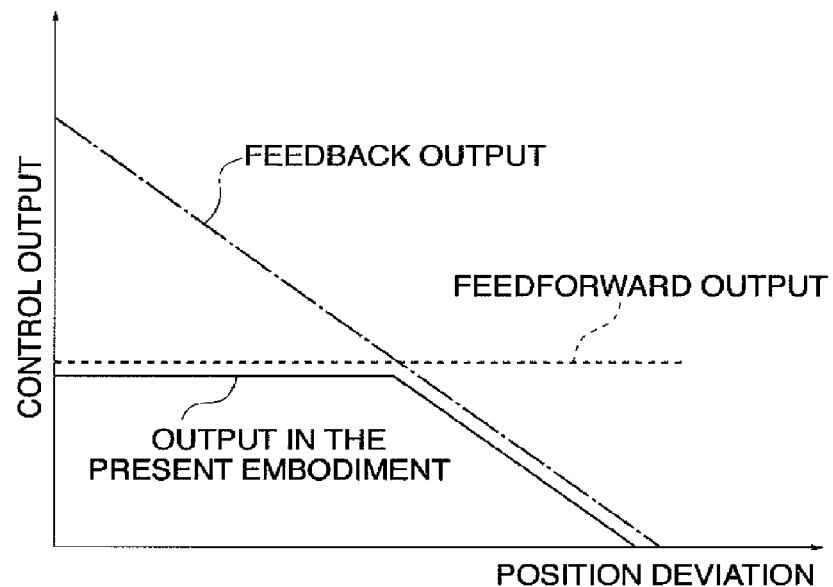
FIG. 25 is a diagram showing switching of control output by the second controller in the present embodiment.
Figure 26:
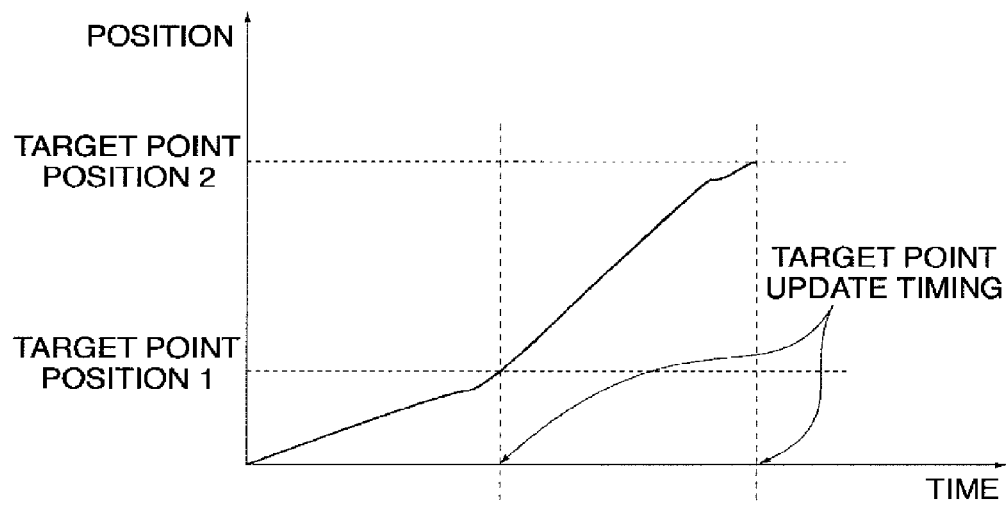
FIG. 26 is a diagram showing responses of position control in the present embodiment.

That is, as shown in FIG. 25, the saturation value (feedforward output) is inputted to the rotation mechanism 120 until the output from the proportional-plus-integral-plus-derivative controller 118 (feedback output) is below the saturation value. When the output from the proportional-plus-integral-plus-derivative controller 118 is below the saturation value, it is inputted to the rotation mechanism 120. The saturation value is set so that it is increased as the amount of one driving increases. Therefore, as shown in FIG. 26, such a value that continuous driving in synchronization with the update of the target position is realized irrespective of whether the driving amount is large or small is outputted.

The feedforward gain is set so that the camera body 1 does not reach the target position before the target point update timing. Thereby, it is possible to perform positioning at the target position without deviation, at the target point update timing, due to the operation of the proportional-plus-integral-plus-derivative controller 118.

A DC servomotor may be adopted as the actuator of the rotation mechanism 120. In this case, the physical quantity of output to be restricted by the dynamic saturation element 119 is a voltage value, a current value or the like. In the case of a digital controller, since such a value is restricted by PWM control or PAM control, pulse width or pulse amplitude may be selected as the quantity to be saturated. Further, a method is also conceivable in which a stepping motor is controlled by pulse frequency. In this case, the quantity to be saturated is the pulse frequency.

As described above, in the present embodiment, the cycle of the first controller 82 causing a target position and a feedforward signal to occur is synchronized with the image acquisition cycle. Further, the control cycle of the second controller 83 is shorter than the cycle, and it is adjusted by a feedforward signal so that continuous driving is performed when tracking is performed. Thereby, according to the present embodiment, it is possible to realize a tracking system enabling high-accuracy, continuous and smooth tracking at a high to low speed. Thus, it is possible to realize continuous and smooth driving and obtain an image with little position variation of a tracking target from a target position within the image and with little blur even when a driving system with a slow response or a driving system lacking stableness in driving is provided.

In a sixth embodiment of the present invention, the configuration of the proportional-plus-integral-plus-derivative controller 118 of the second controller 83 is different from that of the fifth embodiment, and the gain of the proportional-plus-integral-plus-derivative controller 118 is controlled by a feedforward signal. The other elements and the contents of control are the same as corresponding ones of the fifth embodiment.

Figure 27:
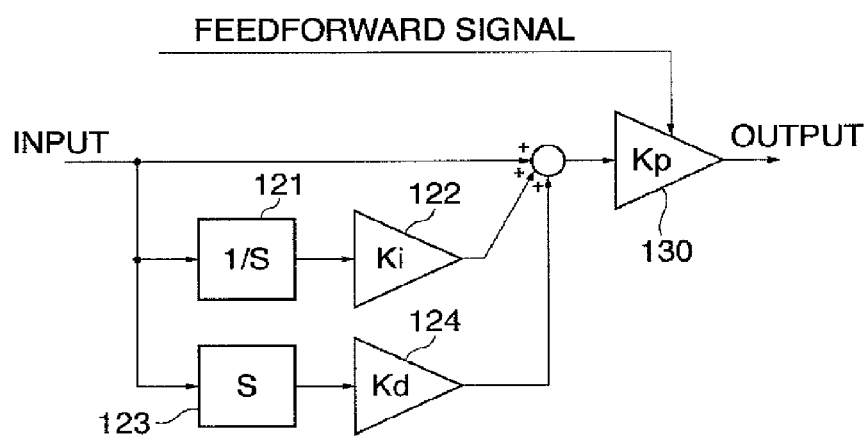
FIG. 27 is a block diagram showing the configuration of a proportional-plus-integral-plus-derivative controller in a sixth embodiment.

FIG. 27 is a block diagram showing the configuration of the proportional-plus-integral-plus-derivative controller 118 in the sixth embodiment. In comparison with the proportional-plus-integral-plus-derivative controller 118 of the fifth embodiment (FIG. 21), a dynamic gain element 130 is provided for this proportional-plus-integral-plus-derivative controller 118 instead of the gain operation unit 125. Similarly to the fifth embodiment, the proportional-plus-integral-plus-derivative controller 118 can be replaced with a proportional controller, a proportional derivative controller or a proportional integral controller as required.

Figure 28:
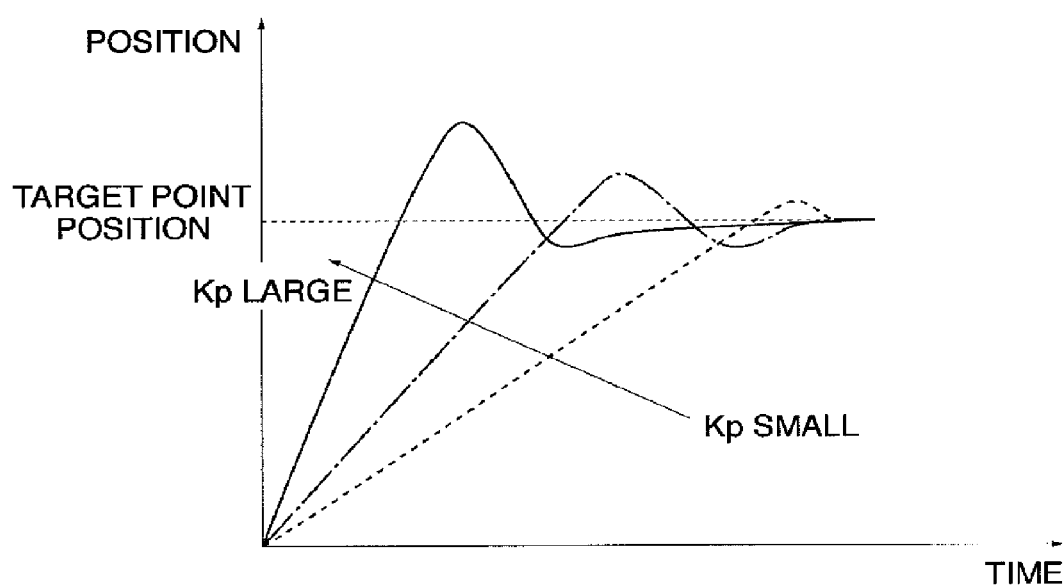
FIG. 28 is a diagram showing values of proportional gain and altered response.

A feedforward signal is inputted to the dynamic gain element 130. The value of the proportional gain Kp of the dynamic gain element 130 changes according to the feedforward signal. That is, Kp is increased when the feedforward amount is large, and Kp is decreased when the feedforward amount is small. As shown in FIG. 28, the initial slope of position change changes according to the value of Kp.

Thus, adjustment is automatically made so that the initial rise is fast when the driving distance for one position update interval is long, and it is slow when the driving distance is short, in accordance with the definition of the feedforward of the first controller 82. Therefore, in this case also, by appropriately adjusting the feedforward gain, the stop time during driving can be shortened as far as possible to realize smooth movement during tracking.

As shown in FIG. 28, when the proportional gain Kp is large, overshoot is also large. Accordingly, a variation as shown below may be adopted.

Figure 30:
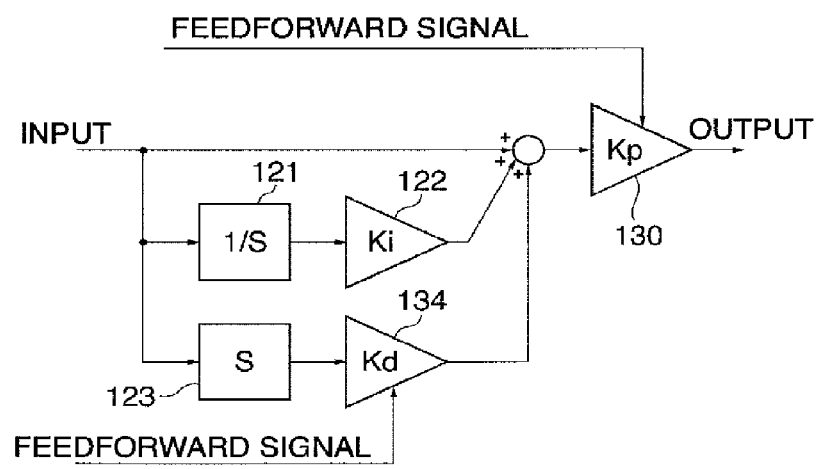
FIG. 30 is a block diagram showing the configuration of a proportional-plus-integral-plus-derivative controller in a variation of the sixth embodiment.

FIG. 30 is a block diagram showing the configuration of a proportional-plus-integral-plus-derivative controller 118 in a variation of the sixth embodiment. In comparison with the configuration in FIG. 27, this proportional-plus-integral-plus-derivative controller 118 is different in that a dynamic gain element 134 is provided instead of the gain operation unit 124, and other points are similar.

Figure 29:
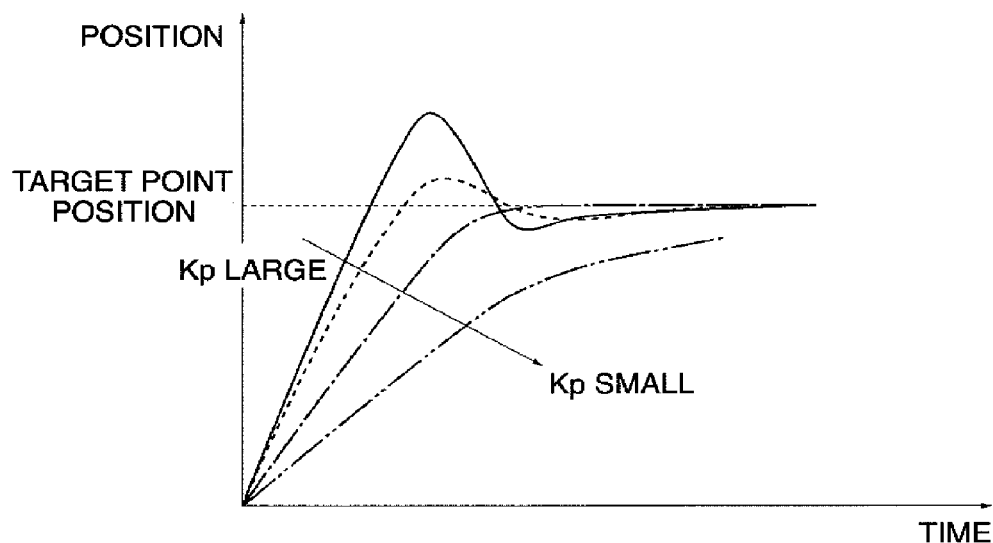
FIG. 29 is a diagram showing values of differential gain and altered response.

As shown in FIG. 29, the overshoot amount can be changed by adjusting the differential gain Kd of the dynamic gain element 134. That is, the response can be always changed in order to prevent overshoot by adjusting the proportional gain of the dynamic gain element 134 and causing the differential gain Kd to be dynamically changed by a feedforward signal according to the value of the proportional gain as shown in FIG. 30.

This variation is characterized in that, since there is not a point where the control method is switched and the driving is continuous during one position update interval, unlike the fifth embodiment, the driving is smoother. Further, it is also characterized in that, since feedback is always applied, resistance to disturbance is strong.

Figure 31:
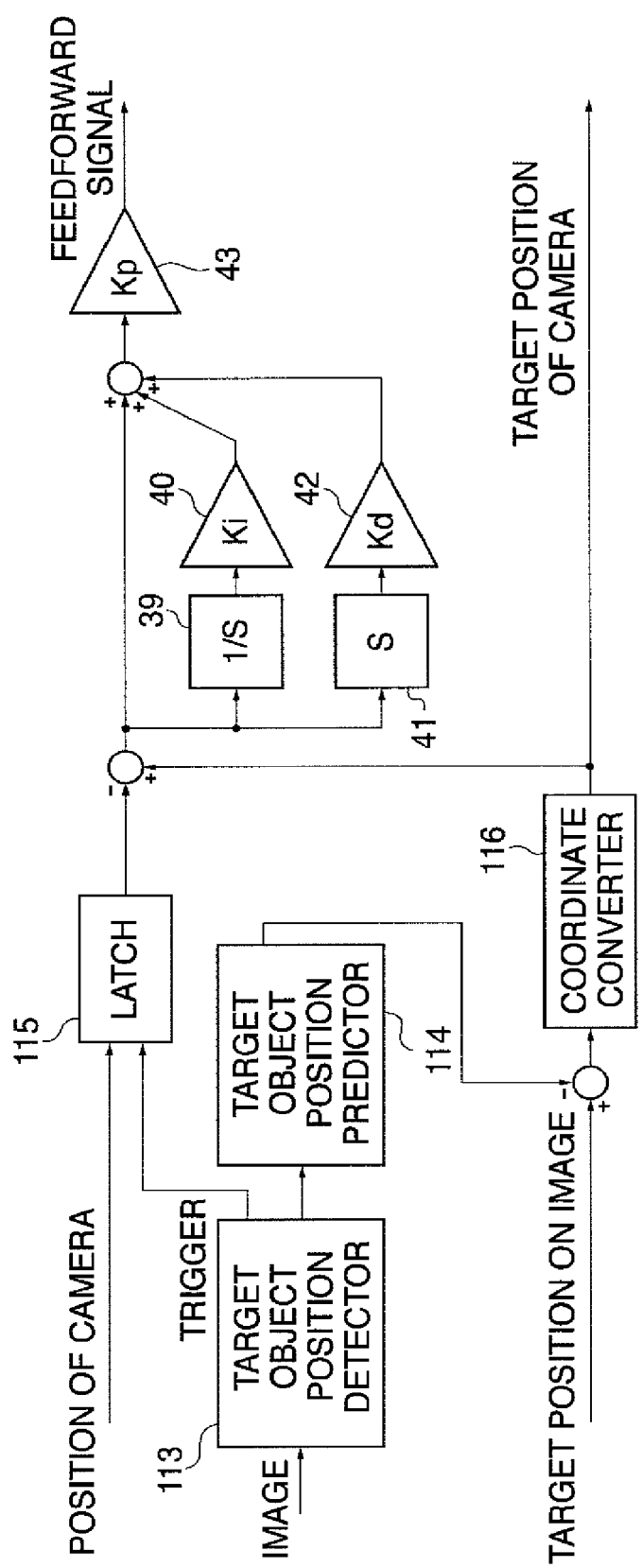
FIG. 31 is a block diagram showing the configuration of a first controller in an automatic-tracking camera apparatus according to a seventh embodiment of the present invention.

FIG. 31 is a block diagram showing the configuration of the first controller in an automatic-tracking camera apparatus according to a seventh embodiment of the present invention.

In the automatic-tracking camera apparatus of the present embodiment, the configuration of the first controller 82 is different from that of the fifth embodiment. The other elements are the same as corresponding ones of the fifth embodiments. Specifically, the configuration is different from the configuration shown in FIG. 19 in that an integrator 39, a differentiator 41, gain operation units 40, 42 and 43 are provided instead of the gain device 117. In FIG. 31, "Kp" represents the proportional gain of the gain operation unit 43; "Ki" represents the integral gain of the gain operation unit 40; and "Kd" represents the differential gain of the gain operation unit 42.

The first controller 82 is adjusted to, when a feedforward signal is inputted to the driver of the actuator of the rotation mechanism 120, independently cause the target position on an image and the position of a target object to coincide with each other. That is, a vision servo-system is configured by the sequence of image—target object detector—first controller—rotation mechanism.

Thus, since it is possible to adjust the first controller 82 and the second controller 83 independently from each other, the adjustment can be easily performed. Further, in the case where the movement of a tracking target is sufficiently slower than the cycle of updating a target point from an image, the first controller 82 works as a feedback controller. Therefore, smoother control with strong resistance to disturbance is possible. Furthermore, in comparison with the case of performing control simply by a vision servo-system, overshoot is less and the follow-up ability is good due to the high speed of the second controller 83.

Since the timescales of image acquisition, target object extraction and vision servo by the first controller 82 are almost the same, the same real-time clock can be used. On the other hand, since high speed is required from the second controller 83, it is preferable that the second controller 83 operates with as fast a clock as possible. It should be noted that, with the configuration in FIG. 31, only the gain operation unit 43, only the gain operation units 42 and 43, or only the gain operation units 40 and 43 may be provided.

It is preferable that the first controller 82 has a flexibility of selecting a target object. On the contrary, the second controller 83 may have fixed characteristics for the rotation mechanism 120 after the gain is adjusted. Thus, it is preferable to implement the first controller 82 with software and implement the second controller 83 with a hardware logic or a dedicated high-speed processor such as a DSP.

In an eighth embodiment of the present invention, the configurations of the first and second controllers are different from those of the fifth embodiment. The other components are similar.

Figure 32:
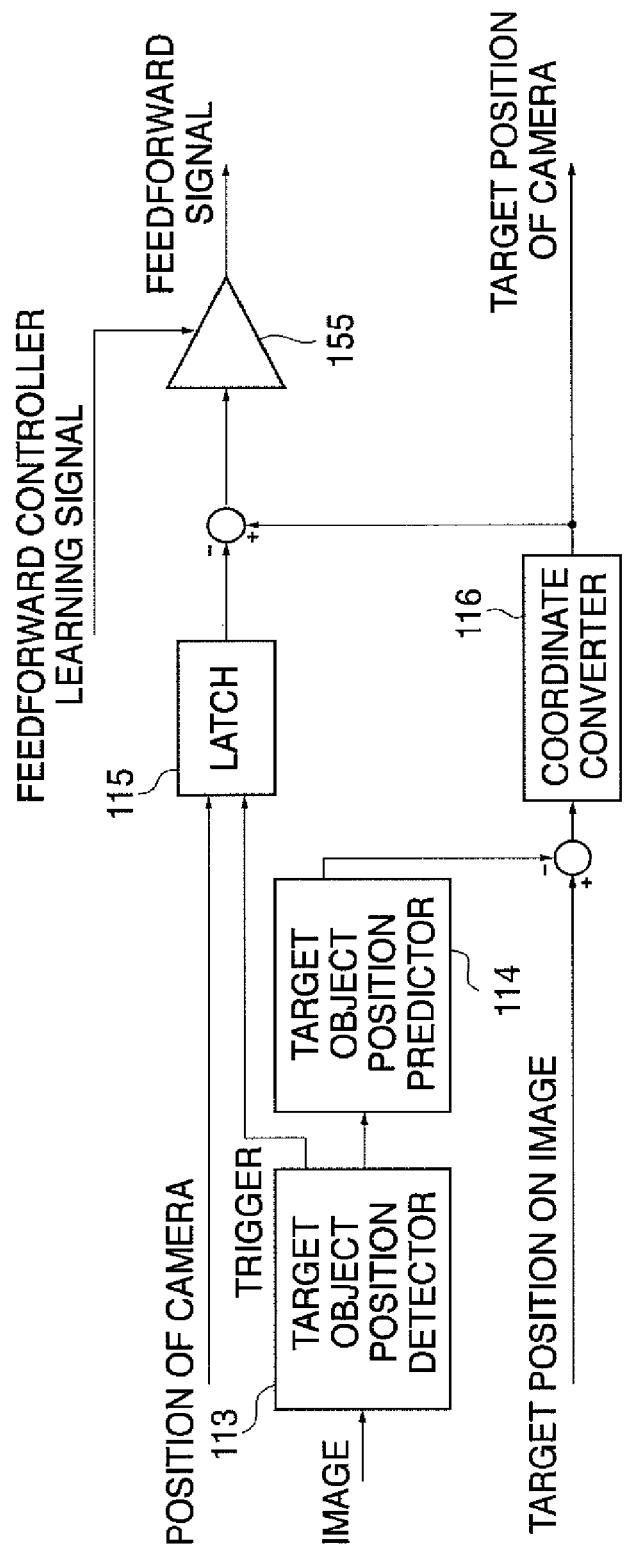
FIG. 32 is a block diagram showing the configuration of a first controller in an automatic-tracking camera apparatus according to an eighth embodiment of the present invention.

FIG. 32 is a block diagram showing the configuration of the first controller 82 in an automatic-tracking camera apparatus according to the eighth embodiment of the present invention. The first controller 82 is different from that of the fifth embodiment (FIG. 19) in that a dynamic gain element 155 capable of dynamically changing gain is provided instead of the gain device 117. The other components are similar.

Figure 33:
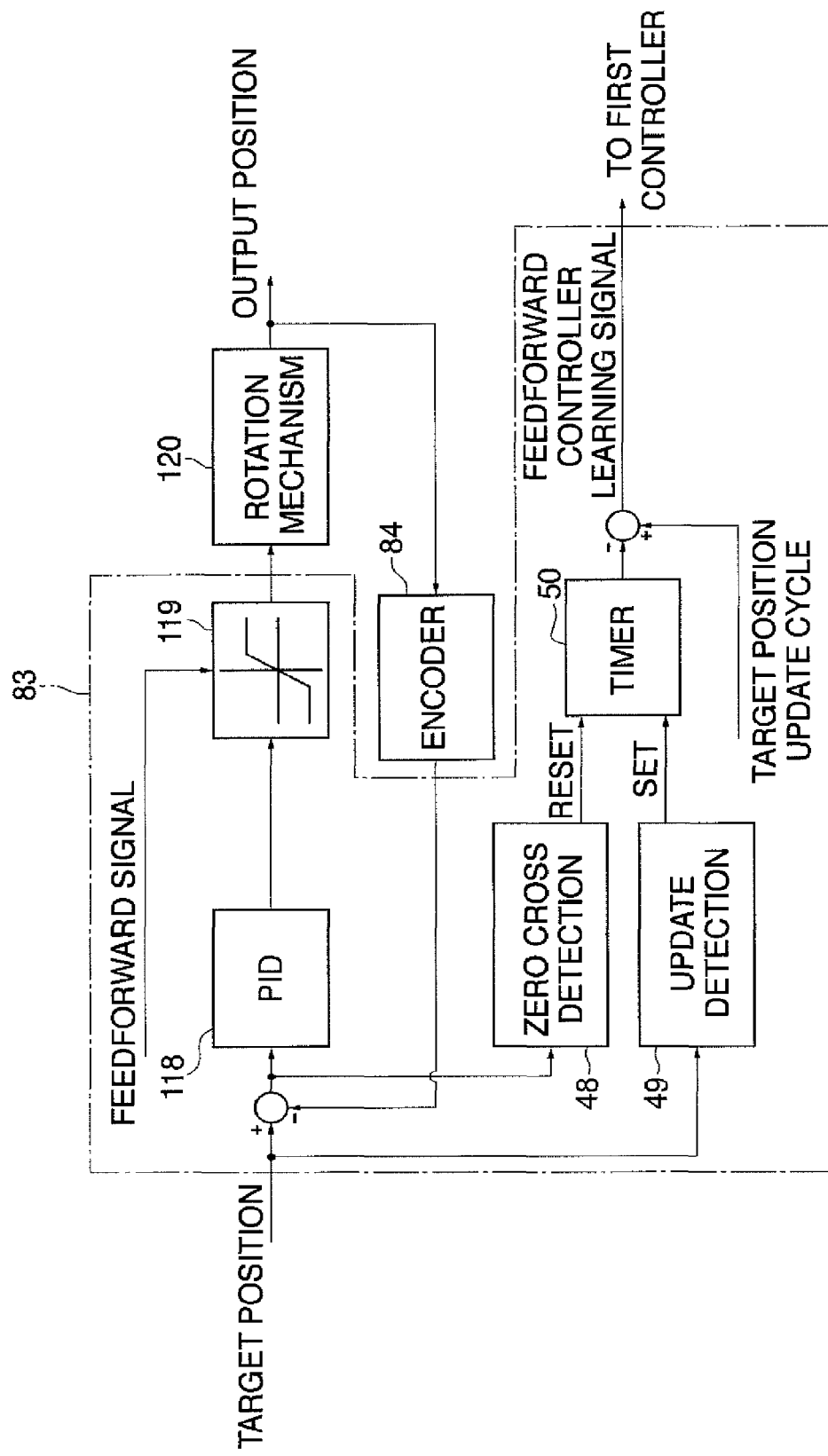
FIG. 33 is a block diagram showing a second controller and related elements thereof in the eighth embodiment.

FIG. 33 is a block diagram showing a second controller 83 and related elements thereof in the eighth embodiment. This second controller 83 is different from that of the fifth embodiment (FIG. 20) in that a zero cross detector 48, a target position update detector 49 and a timer 50 are provided. The other components are similar.

The zero cross detector 48 detects that the position of the camera body 1 has reached a target position. The target position update detector 49 detects that the target position has been updated. The timer 50 is set by the target position update detector 49 and reset by the zero cross detector 48. In this way, the time required for reaching the target position is measured. The difference between the measured time and the target position update cycle is sent out to the dynamic gain element 155 of the first controller 82 as feedforward controller learning output (see FIG. 32).

When the zero cross detector 48 cannot detect that the target position has been reached even if the next update signal arrives, the timer 50 compulsorily outputs the value of the timer at that time point and starts the next measurement. The zero cross detector 48 is shown as a device for detecting that the target position has been reached in FIG. 33. However, a detector for detecting that the residual is within a predetermined range may be used instead of the zero cross detector 48. Alternatively, it is also possible to use a detector for, when overshoot at the time of positioning is assumed, determining that the target position has been reached if the residual time is equal to or below a specified value.

In the first controller 82 shown in FIG. 32, a feedforward controller learning signal is inputted to the dynamic gain element 155 from the second controller 83 as negative feedback. As a result, the gain of the dynamic gain element 155 is changed so that the gain is decreased if the camera body 1 reaches the target position earlier than the position update time, and so that the gain is increased if the camera body 1 does not reach the target position until the position update time. Accordingly, even if the characteristics of the control system change with passage of time or the like, continuous and smooth driving is kept due to the learning effect.

Figure 34:
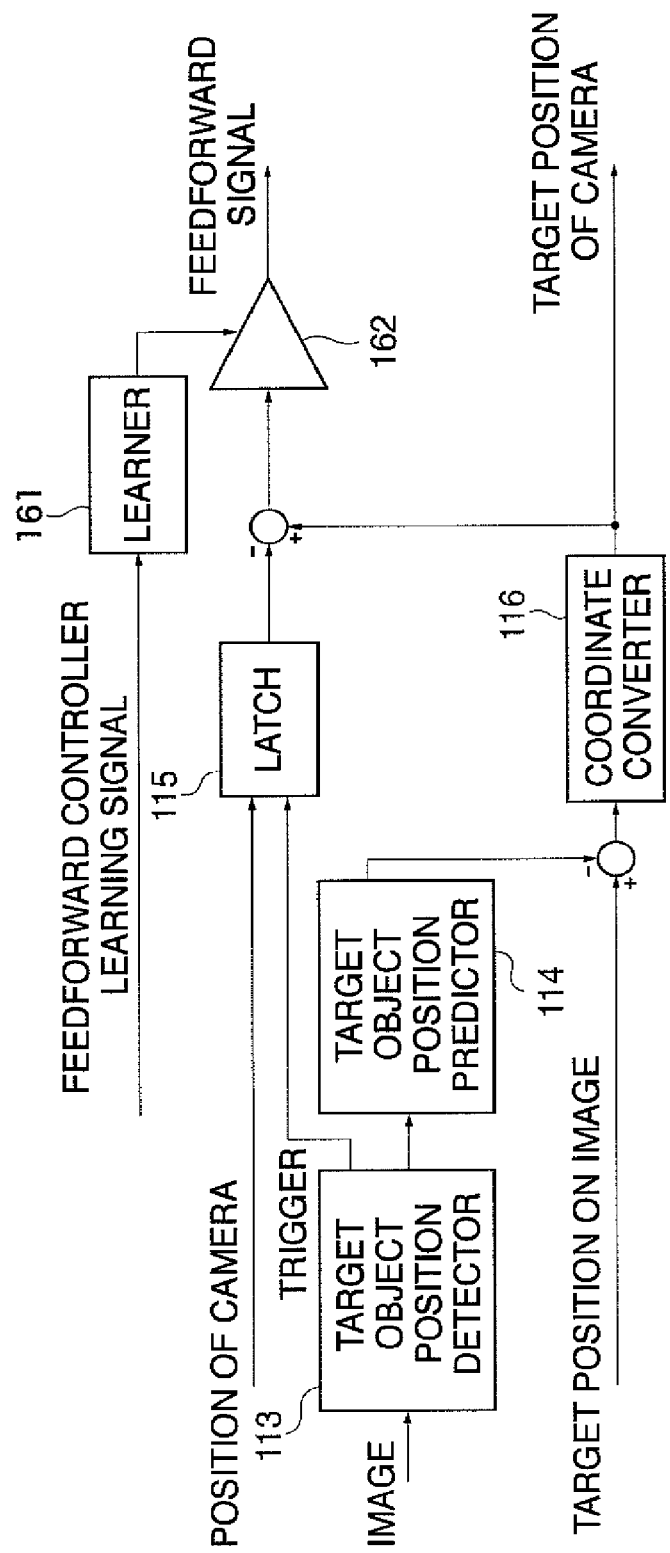
FIG. 34 is a block diagram showing the configuration of a first controller in an automatic-tracking camera apparatus according to a variation of the eighth embodiment.
Figure 35:
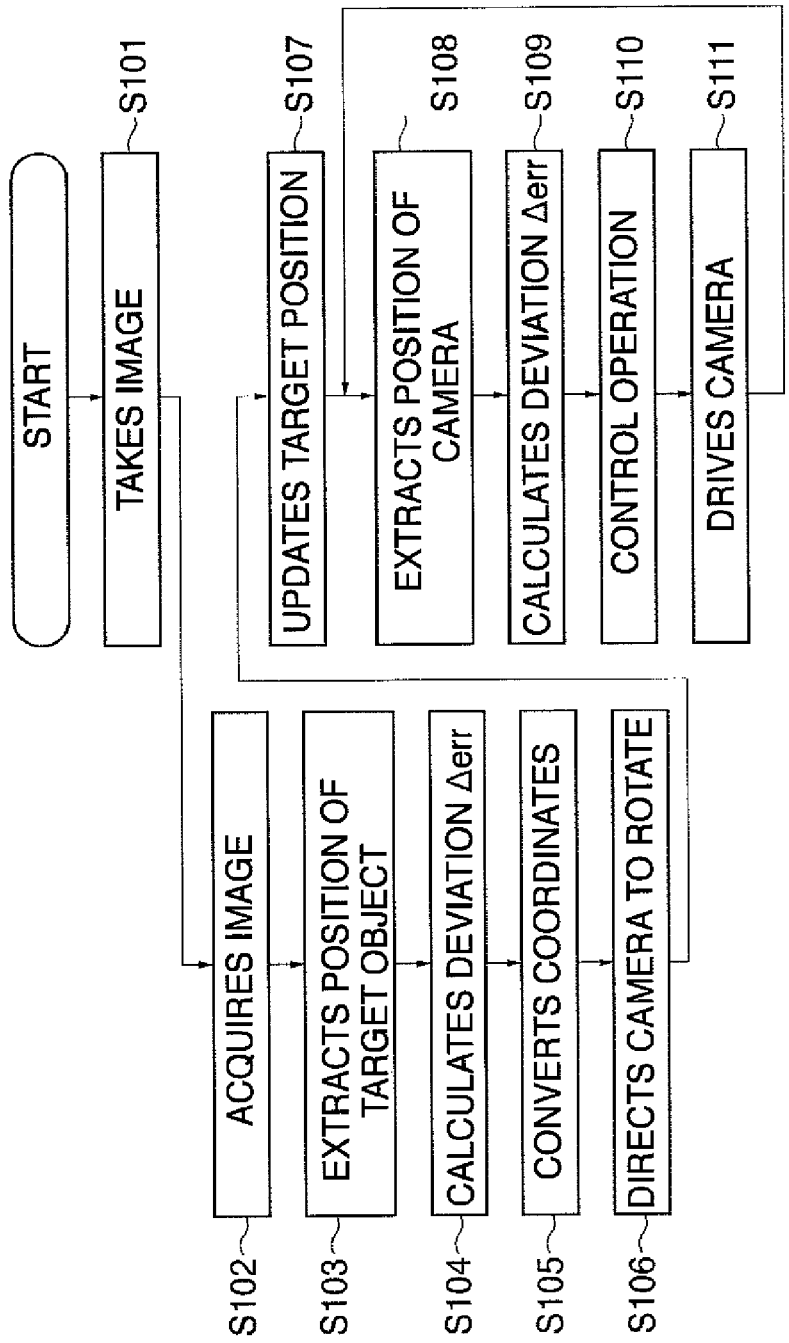
FIG. 35 is a block diagram showing rotation driving control in a conventional automatic-tracking camera apparatus.

As shown in FIG. 34, it is also possible to provide a dynamic gain element 162 for the first controller 82 shown in FIG. 32, instead of the dynamic gain element 155, and provide a learner 161, such as a well-known neural network, connected to the dynamic gain element 162.

If the dynamic gain element 162 is a proportional-plus-integral-plus-derivative controller, multiple outputs are required. However, by defining a multi-output function by a neural network learner, designing of a controller is facilitated. Further, by adding a low-pass filter element to the learner 161, it is possible to avoid a situation in which response is significantly changed by abrupt change and uncomfortable feeling is given.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-238156, filed Sep. 1, 2006, which is hereby incorporated by reference herein in its entirety.

What is claimed is:

1. An automatic-tracking apparatus comprising:
   an image pickup unit adapted to acquire an image;
   an actuator adapted to change a position of said image pickup unit;
   a position detecting unit adapted to detect the position of said image pickup unit;
   a position instruction value generation unit adapted to generate a position instruction value, for instructing a target position of said image pickup unit, realizing after a lapse of a predetermined time period from when said image pickup unit has acquired the image, on the basis of the image acquired by said image pickup unit and the position of said image pickup unit detected by said position detecting unit;
   a speed prediction unit adapted to predict a speed of a tracking target object realizing after a lapse of a predetermined time period from when said image pickup unit has acquired the image, using previously stored position information and speed information of the tracking target object, the position information and speed information obtained from multiple acquired images; and a control unit adapted to control said actuator so that said image pickup unit reaches the position indicated by the position instruction value realizing after a lapse of a predetermined time period from when said image pickup unit has acquired the image, and the speed of said image pickup unit realizing after a lapse of a predetermined time period from when said image pickup unit has acquired the image corresponds to the speed predicted by said speed prediction unit, wherein said control unit is adapted to control said actuator so that said image pickup unit is displaced at a constant acceleration during the period from the start timing of image acquisition by said image pickup unit to the next start timing of image acquisition.

2. An automatic-tracking apparatus according to claim 1, wherein said control unit is adapted to control said actuator so that change in the acceleration of said image pickup unit during the period of image acquisition by said image pickup unit is the minimum.

3. An automatic-tracking apparatus according to claim 2, wherein said control unit is adapted to control said actuator so that the acceleration of said image pickup unit gradually increases during the period from generation of the position instruction value by said position instruction value generation unit to the start timing of image acquisition by said image pickup unit.

4. An automatic-tracking method for an apparatus having an image pickup unit adapted to acquire an image and an actuator adapted to change the position of said image pickup unit, comprising steps of:

a position detecting step of detecting the position of said image pickup unit;

a position instruction value generation step of generating a position instruction value, for instructing a target position of said image pickup unit, realizing after a lapse of a predetermined time period from when said image pickup unit has acquired the image, on the basis of the image acquired by said image pickup unit and the position of said image pickup unit;

a speed prediction step of predicting a speed of a tracking target object realizing after a lapse of a predetermined time period from when said image pickup unit has acquired the image, using previously stored position information and speed information of the tracking target object, the position information and speed information obtained from multiple acquired images; and a control step of controlling said actuator so that said image pickup unit reaches the position indicated by the position instruction value realizing after a lapse of a predetermined time period from when said image pickup unit has acquired the image, and the speed of said image pickup unit realizing after a lapse of a predetermined time period from when said image pickup unit has acquired the image corresponds to the predicted speed, wherein said control step controls said actuator so that said image pickup unit is displaced at a constant acceleration during the period from the start timing of image acquisition by said image pickup unit to the next start timing of image acquisition.

5. An automatic-tracking method according to claim 4, wherein in said control step the maximum driving force of said actuator is controlled on the basis of the feedforward signal.

6. An automatic-tracking method according to claim 4, wherein a signal for controlling said actuator is output by performing at least proportional operation or proportional differential operation of the deviation between the position instruction value and the position, and at least one of the proportional gain of the proportional operation and the differential gain of the proportional differential operation are changed on the basis of the feedforward signal.

7. An automatic-tracking method according to claim 4, wherein in said signal generation step at least proportional operation of the deviation between the target position instructed by the position instruction value and the position at the time of generation of the instruction value to generate the feedforward signal.

8. An automatic-tracking method according to claim 4, wherein the feedforward signal is a value learned on the basis of the deviation between the time when said image pickup unit reaches the target position and the time when the target position is updated.

9. An automatic-tracking apparatus comprising:

an image pickup unit adapted to acquire an image;

an actuator adapted to change a position of said image pickup unit;

a position detecting unit adapted to detect the position of said image pickup unit; and a control unit adapted to predict a speed of a tracking target object realizing after a lapse of a predetermined time period from when said image pickup unit has acquired the image, using previously stored position information and speed information of the tracking target object, the position information and speed information obtained from multiple acquired images, and control said actuator so that said image pickup unit reaches the speed of said image pickup unit realizing after a lapse of a predetermined time period from when said image pickup unit has acquired the image corresponds to the predicted speed, wherein said control unit is adapted to control said actuator so that said image pickup unit is displaced at a constant acceleration during the period from the start timing of image acquisition by said image pickup unit to the next start timing of image acquisition.

10. An automatic-tracking method for an apparatus having an image pickup unit adapted to acquire an image and an actuator adapted to change the position of said image pickup unit, comprising steps of:

a position detecting step of detecting the position of said image pickup unit; and a control step of predicting a speed of a tracking target object realizing after a lapse of a predetermined time period from when said image pickup unit has acquired the image, using previously stored position information and speed information of the tracking target object, the position information and speed information obtained from multiple acquired images, and controlling said actuator so that said image pickup unit reaches the speed of said image pickup unit realizing after a lapse of a predetermined time period from when said image pickup unit has acquired the image corresponds to the predicted speed, wherein said actuator is controlled so that said image pickup unit is displaced at a constant acceleration during the period from the start timing of image acquisition by said image pickup unit to the next start timing of image acquisition.

* * * * *